US011248900B2

(12) United States Patent
Körner et al.

(10) Patent No.: US 11,248,900 B2
(45) Date of Patent: Feb. 15, 2022

(54) METHOD AND ASSEMBLY FOR CHROMATIC CONFOCAL SPECTRAL INTERFEROMETRY OR SPECTRAL DOMAIN OCT

(71) Applicant: Universitat Stuttgart, Stuttgart (DE)

(72) Inventors: Klaus Körner, Berlin (DE); Daniel Claus, Illertissen (DE); Alois Herkommer, Aalen (DE); Christof Pruss, Ostfildern (DE)

(73) Assignee: Universität Stuttgart, Stuttgart (DE)

( * ) Notice: Subject to any disclaimer, the term of this patent is extended or adjusted under 35 U.S.C. 154(b) by 0 days.

(21) Appl. No.: 16/770,556

(22) PCT Filed: Dec. 18, 2017

(86) PCT No.: PCT/EP2017/083255
§ 371 (c)(1),
(2) Date: Jun. 5, 2020

(87) PCT Pub. No.: WO2019/120470
PCT Pub. Date: Jun. 27, 2019

(65) Prior Publication Data
US 2020/0378743 A1    Dec. 3, 2020

(51) Int. Cl.
*G01B 9/02*    (2006.01)
(52) U.S. Cl.
CPC ..... *G01B 9/02042* (2013.01); *G01B 9/02036* (2013.01); *G01B 9/02044* (2013.01); *G01B 9/02091* (2013.01); *G01B 2210/50* (2013.01)
(58) Field of Classification Search
CPC ............ G01B 9/02042; G01B 9/02036; G01B 9/02044; G01B 9/02091; G01B 2210/50
See application file for complete search history.

(56) References Cited

U.S. PATENT DOCUMENTS

2008/0151253 A1*  6/2008 Korner .............. G01B 9/02057
                                                       356/451
2014/0300904 A1    10/2014 Yuki
(Continued)

FOREIGN PATENT DOCUMENTS

DE        102010046907 B4      1/2013

OTHER PUBLICATIONS

International Search Report dated Dec. 18, 2018 in International Patent Application No. PCT/EP2017/083255, 15 pages.

*Primary Examiner* — Jonathan M Hansen
(74) *Attorney, Agent, or Firm* — Shook, Hardy & Bacon L.L.P.

(57) ABSTRACT

The present invention relates to a method and an assembly for chromatic confocal spectral interferometery, in particular also for spectral domain OCT (SD-OCT) using multi-spectral light. A multiple (e.g. two, three, four, etc.) axial splitting of foci in the interferometric object arm is performed using a multifocal (e.g. bifocal, trifocal, quattro-focal, etc.) optical component, forming thereby at least two, three or even several groups of chromatically split foci in the depth direction. The multifocal optical component is made of a diffractive optical element (712) and a Schwarzschild objective (5). At least two, three, four or even more differently colored foci of different groups of foci coincide in at least one confocal point in the object space of the setup. Thus, at least two, three or even more spectral wavelets are formed in the case of optical scanning of an object measurement point and spectral detection in the wavenumber domain, which wavelets are at least slightly spectrally separated from each other. This results in a significant increase in the optical primary data in the wavenumber domain and reduces the trade-off of the chromatic confocal spectral interferometry between axial measurement range and depth resolution. From the detected data, it is possible to calculate tan (alpha)

(Continued)

as the quotient of the absolute phase shift delta_phi and the associated wavenumber difference delta_k, the Fourier transform over the spectral data, in order to respectively determine the optical path difference.

13 Claims, 18 Drawing Sheets

(56) References Cited

U.S. PATENT DOCUMENTS

2020/0173855 A1\* 6/2020 Munro ............... G01B 9/02036
2020/0173921 A1\* 6/2020 Fujiwara ................... F21V 9/35

\* cited by examiner

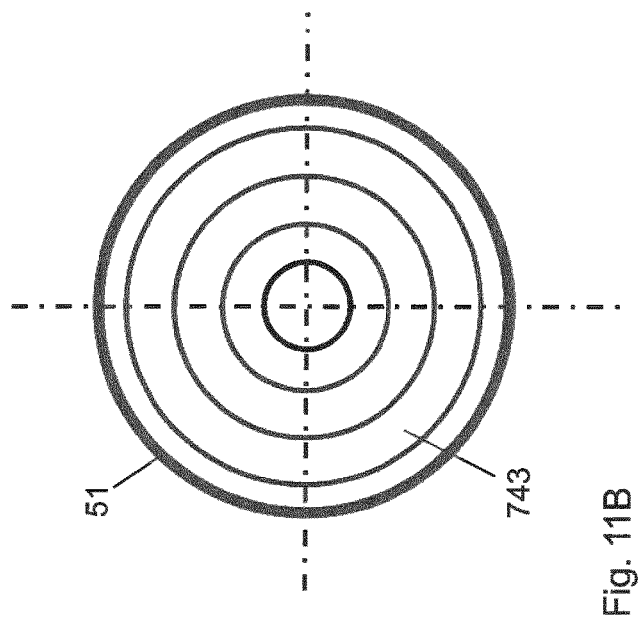
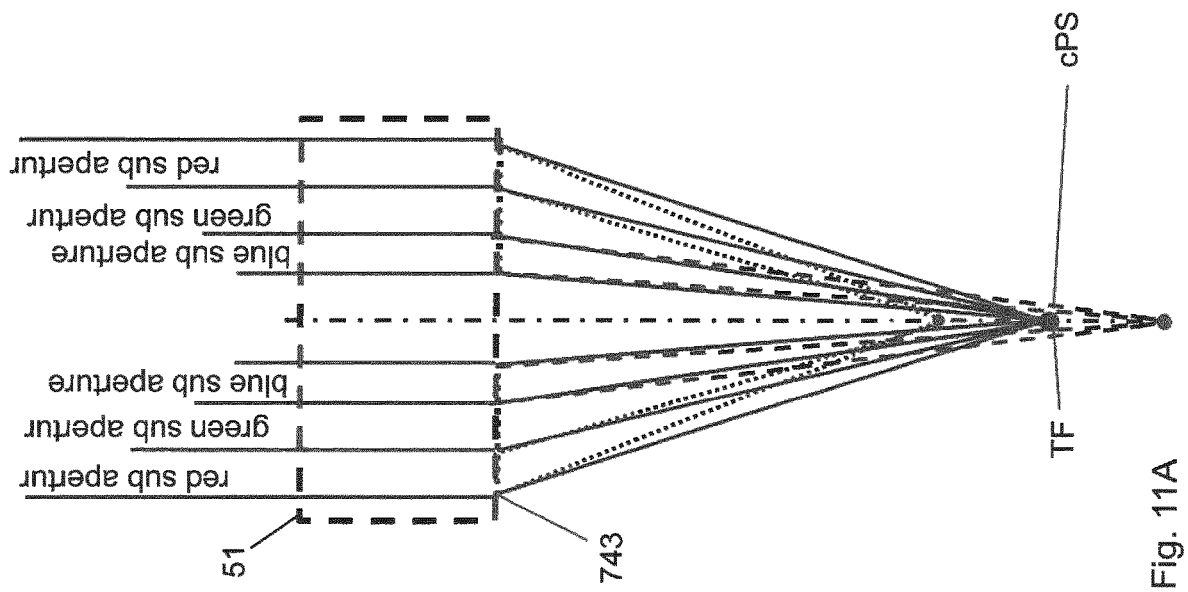
Fig. 11B
Fig. 11A

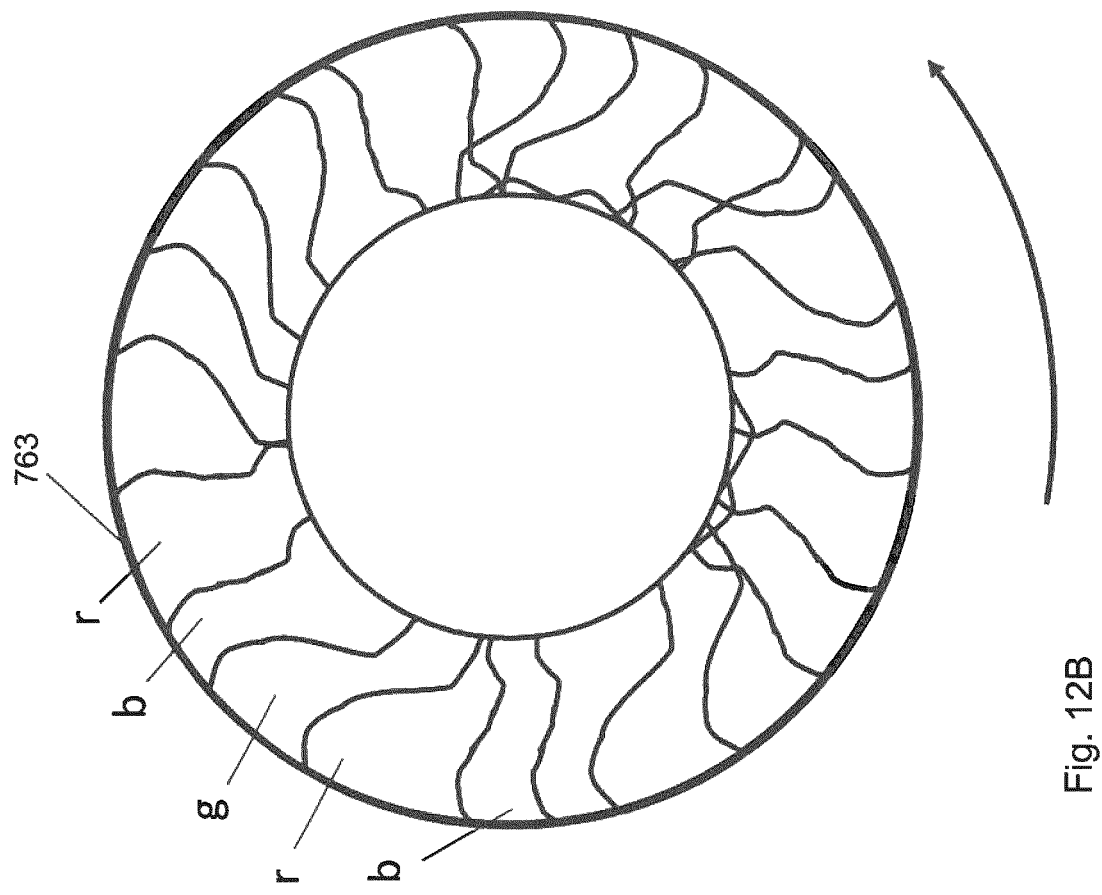
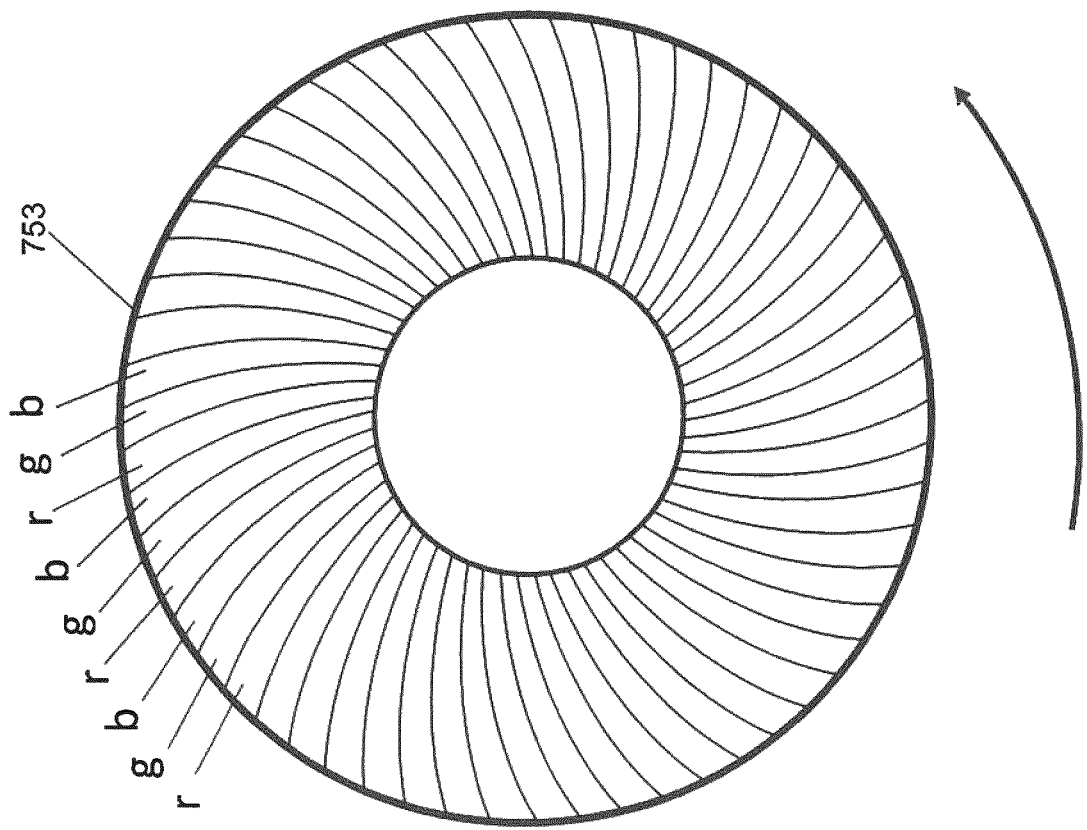
Fig. 12A
Fig. 12B

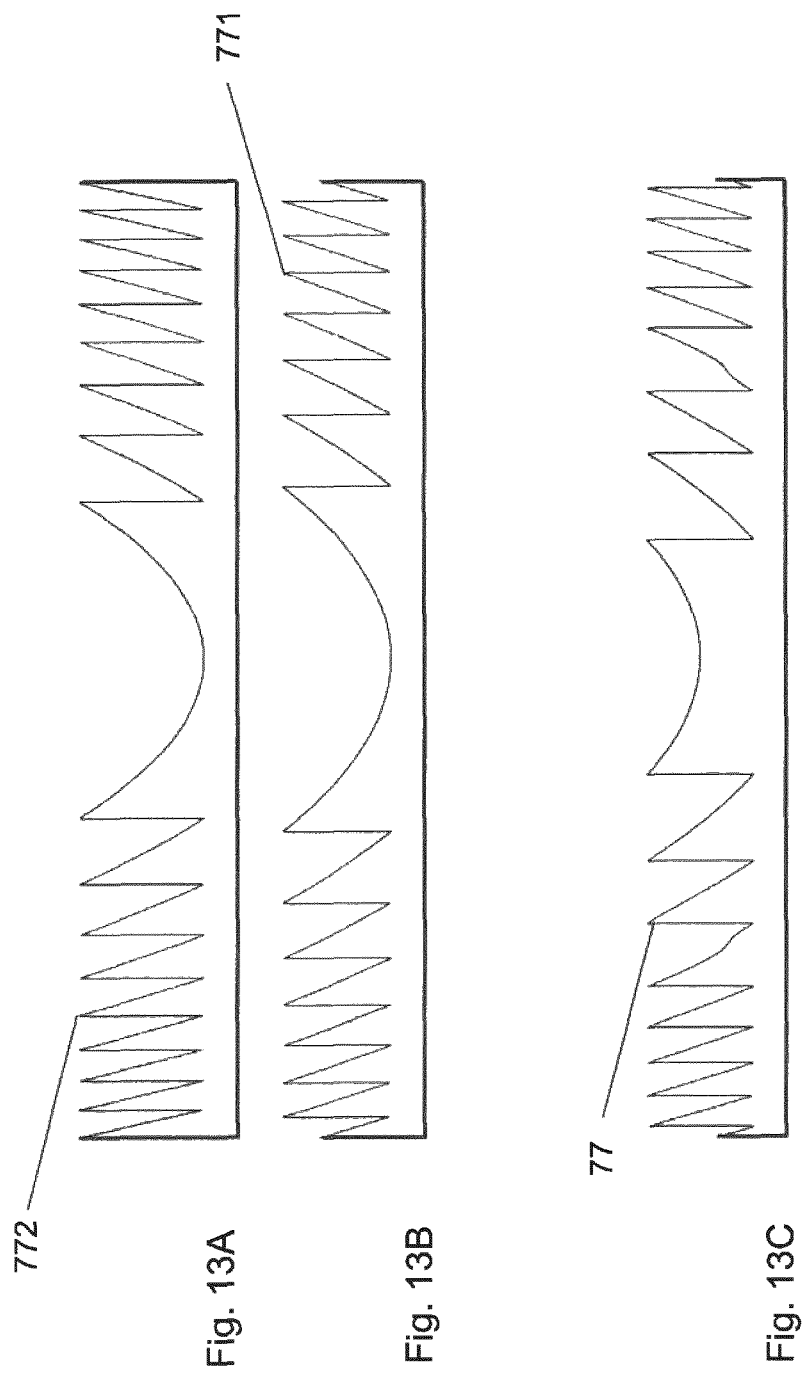

METHOD AND ASSEMBLY FOR CHROMATIC CONFOCAL SPECTRAL INTERFEROMETRY OR SPECTRAL DOMAIN OCT

CROSS-REFERENCE TO RELATED APPLICATIONS AND PRIORITY CLAIM

This non-provisional patent application, submitted under 35 U.S.C. 371, claims priority to co-pending PCT App. No. PCT/EP2017/083255, filed Dec. 18, 2017, titled "METHOD AND ASSEMBLY FOR CHROMATIC CONFOCAL SPECTRAL INTERFEROMETRY OR SPECTRAL DOMAIN OCT," the entire contents of which is incorporated herein by reference.

The obtaining of information about an object form and/or object position without moving mechanical parts is a subject of ongoing interest. This applies in particular to microscopic white light interferometry (short coherence interferometry).

One early approach including spectral analysis is described in the pioneering publication "Space and time variables in optics and holography: recent experimental aspects" by J.-C. Viénot, J.-P. Goedgebuer, and A. Lacourt, published in Applied Optics, vol. 16, pp. 454-461 (1977).

Another approach, based on white light interferometry (short coherence interferometry), is described in the dissertation of G. Hege, "Speckleverfahren zur Abstandsmessung", published in reports from the Institute for Technical Optics (ITO), vol. 4, 1984, pp. 20-25. Here, the interfering light is analyzed spectrally at the output of an interferometer. However, with this approach, no high lateral resolution can be achieved in case of objects with a large depth extension.

The patent application DE 43 09 056 A1 describes an interferometric method in which the light is decomposed into a spectrum at the output of an interferometer. However, also with this approach, no high lateral resolution can be achieved in case of a larger depth extension of the object.

The publication "Dispersive interferometric profilometer" by J. Schwider and L. Zhou, published in Opt. Lett., vol. 19. No. 13, 1994, describes an interferometric system which combines a Fizeau interferometer and a spectrometer. In this system, the interference signal is split spectrally by a grating, so that Mueller's bands, also known as Tolansky bands, can be observed in the receiving plane. However, the depth measurement range is limited by the numerical aperture of the object image.

In the publication by G. Li, P.-Ch. Sun, P. C. Lin, and Y. Fainman, "Interference Microscopy for three-dimensional imaging with wavelength-to-depth encoding" published in Optics Letters, Oct. 15, 2000, vol. 20, no. 20, pp. 1505 to 1507, the chromatic depth splitting of a focus with a diffractive lens in the object optical path in conjunction with a tunable laser is described. There is a clear relationship between the focus position $z\_k$ (depth of focus) and the wavenumber k.

The published patent application DE10 2010 046 907 A 1 describes a robust one-shot-interferometer and a method. FIG. 2 of DE 10 2010 046 907 A1 shows an arrangement including a part of a Schwarzschild objective for object illumination and imaging with a downstream weak-focusing diffractive optical element with positive refractive power (Fresnel lens 15) for chromatic depth splitting of foci in a two-beam interferometer. This allows detecting measurement points in different depths simultaneously in the object space. In the optical path, there are refractive materials which, can produce dispersions that can lead to nonlinearities in the detected spectral wavelet. This can complicate the signal evaluation.

The publication by P. Kühnhold, P. Lehmann, and J. Niehus with the title "Dispersion optimized white light interferometer based on a Schwarzschild objective", published in Proc. of SPIE Vol. 8082, 80822Q in 2011, doi 10.1117/12.889434, describes a depth-scanning arrangement with a Pellicle beam splitter. The latter generates undesirable multiple reflections and may be prone to vibrations. Moreover, no single-shot measurement is possible due to the scanning. During measurements in an industrial environment, vibrations at the thin beam splitter can influence the measurement. Also, the Pellicle beam splitter in front of the object reduces the free working distance of the measuring system.

A chromatic confocal Fourier domain OCT approach, also with phase evaluation, is described by K. Körner and W. Osten in DE 10 321 895 A 1. In this approach, a spectral element with a variable refractive power is inserted in the Fourier plane of the associated imaging system of a spectral interferometer, said element producing the desired chromatic longitudinal splitting or depth splitting of the object bundle in the object space also for a field with a minimum of color lateral aberrations (lateral color). Here, there is an unambiguous relationship between the focus position $z\_k$ (depth of focus) and the wavenumber k.

A common-path assembly for chromatic confocal spectral interferometry is described in the document EP 1 984 770 B1.

Furthermore, mention must be made of the studies on chromatic confocal spectral interferometry (CCSI) by E. Papastathopoulos, K. Körner, and W. Osten, "Chromatically dispersed interferometry with wavelet analysis", published in Optics Letters 31, pages 589-591, E. Papastathopoulos, K. Körner, and W. Osten, "Chromatic Confocal Spectrum Interferometry with Wavelet Analysis", published in Proc. SPIE 6189 and E. Papastathopoulos, K. Körner, and W. Osten, "Chromatic Confocal Spectral Interferometry (CCSI)", published in Proc. SPIE 6292 [12] and E. Papastathopoulos, K. Körner, and W. Osten, "Chromatic Confocal Spectral Interferometry", Appl. Opt. 45, no. 32, pp. 8244-8252.

In the publication by Liang-Chia Chen, Yi-Shivan Chen, Yi-Wei Chang, Shyh-Tsong Lin, Sheng Lih Yeh "Spectrally-resolved chromatic confocal interferometry for one-shot nanoscale surface profilometry with several tens of micrometric depth range", published in Proc. of SPIE, vol. 8759, 87592C1 to -C6, results with a chromatic confocal spectral interferometer (CCSI) with a spectral wavelet are described.

The published patent application DE 10 2010 046 907 A1 describes a spectral interferometer with chromatic depth splitting including a Schwarzschild objective 117 and a refraction-compensated diffractive-optical element 194 (see FIG. 10 of DE 10 2010 046 907 A1). In the reference optical path, the dispersion of the substrate of the element 194 can be compensated for by matching the glass path lengths. In connection with the Schwarzschild objective 117, the influence of the dispersion can be greatly reduced, even if the pupil of the Schwarzschild objective 117 is unevenly illuminated by an inclined surface of the object. In the case of refractive optical systems, particularly in the peripheral region of the pupil, even in the case of well-corrected microscope objectives, considerable chromatic aberrations (in interferometric sense) can still be observed. Such chromatic aberrations which may become dominant in the case of measuring an inclined surface of the object. However, if a Schwarzschild objective is employed as a mirror objective, these effects do not occur in principle.

One fundamental disadvantage of the known methods for chromatic confocal spectral interferometry of the prior art is that there is an undesirable trade-off between the spectral range given by the source and the spectral range in the detected signal remaining due to the confocal discrimination. This is because only light components of the wavenumbers of the foci that are sharply focused on or at the object and thus can pass through the confocal aperture essentially contribute to the detected signal. However, with the increasing of the axial spread of the foci due to the variable refractive power means (over the wavenumber) the remaining spectral range in the detected signal is becoming ever narrower. According to the principles of Fourier optics, the spectral bandwidth of the evaluated/detected signal determines—in a well-known manner—the axial resolution of a sensor, which is inversely proportional to the spectral bandwidth. In the case of a narrow remaining spectral range, the frequency of the wavelet—in which the optical path difference and thus also the information about the depth position of the object is contained—can only be determined in a comparatively rough manner by a Fourier transform. The phase increase over the wavenumber can also only be determined in a comparatively rough manner because of the reduced data content. This greatly reduces the capability for a highly accurate determination of the depth position of a measured object point, especially if the object has a non-continuous (in the terms of interferometry) surface.

The present invention aims to alleviate one or more of the above problems. In particular, one aim is to provide a compact sensor, in particular a single-shot point sensor, with a high depth measurement resolution and low depth measurement uncertainty (low uncertainty of measurement) based on the principles of chromatic confocal spectral interferometry, in particular for spectral domain OCT (SD-OCT). A further aim is to provide a sensor suitable for commercial exploitation, also in industrial environment.

Examples and aspects of the invention may further relate to one or more of the following objects:

One object is to avoid the influence of dispersions in the interferometric optical path in order to generate spectral signals in the wavenumber domain (wavelets) with a minimum of nonlinearities in the signal and a broad spectral bandwidth. A further object is to minimize the spatial expansion, in particular in the transverse axis of a single-shot point sensor. Another object is to provide a comparatively vibration-resistant interferometer assembly. Still another object is to increase the spectral bandwidth of the spectral signal in a chromatic-confocal spectral interferometry or a spectral domain OCT system.

In the following, the term light is always used as a synonym for electromagnetic radiation from the terahertz through the infrared to the EUV range, or even in the X-ray spectrum. Usually, an electromagnetic signal or wave is described by reference to the wavenumber(s) rather than to wave length(s). It is of, course, possible to use wave lengths instead of wavenumbers.

One or more of the above mentioned objects may be achieved by simultaneously generating at least two wavelets so as to achieve a significant increase of the amount of optical primary data in the wavenumber domain (i.e. the amount of usable detected spectral data). This may significantly improve the depth measurement resolution.

In particular, according to an aspect there is provided a method and an assembly for chromatic confocal spectral interferometry, in particular in the single-shot operation, for detecting distance, depth, profile, shape, ripple and/or roughness of the optical path length in or on technical or biological objects, (including objects in layer form, i.e. objects comprising a plurality of layers). The proposed method and assembly may also be employed for spectral domain optical coherence tomography (SD-OCT). The measurement is performed in at least one point of the object, hereinafter referred to as measurement point, in which a surface or volume element of the object to be measured is at least approximately located.

The assembly comprises a multispectral source of electromagnetic radiation (light source) for illuminating the object with light including a plurality of spectral components having at least two distinct predetermined wavenumbers. The predetermined distinct wavenumbers will be hereinafter referred to as "design wavenumbers", i.e. wavenumbers for which the assembly is designed to operate. In addition, the light emitted from the multispectral source of electromagnetic radiation may comprise spectral components having further wavenumbers, which are different from the design wavenumbers. For example, each spectral component having a particular design wavenumber may be surrounded by spectral components having the further wavenumbers, i.e. may be embedded in a spectrum. The spectrum in which the spectral components having the design wavenumbers are embedded may be a continuum/continuous spectrum. The light of the design wavenumbers thus represents spectral (sub)-components of the continuum spectrum or the continuum spectra. The discrete design wavenumbers may be embedded in a common continuum spectrum, or each of the design wavenumber may be embedded in a corresponding continuum spectrum.

The assembly comprises further an interferometer, with an object optical path (hereinafter also referred as object beam path), and with a reference optical path (hereinafter also referred to as reference beam path). The interferometer may be a spectral interferometer. The object optical path may be a chromatic optical path and the reference optical path a substantially achromatic optical path. In the reference optical path, an end reflector is arranged. In the object optical path, the at least one measurement point is arranged. Further, the assembly comprises an optical imaging system for illuminating and imaging at least one single object point of the object, in particular for illuminating and imaging the at least one measurement point of the object.

In addition, the assembly comprises a detector assembly for detecting electromagnetic radiation in the form of at least one spectral wavelet. The detector assembly may, for example, comprise a spectrometer with a rasterized detector for detecting electromagnetic radiation in the form of at least one spectral wavelet (sWL). Alternatively, the source of electromagnetic radiation may be a tunable light source and the detector assembly may comprise a detector for detecting electromagnetic radiation in the form of at least one spectral wavelet (sWL) as the wavelength of the tunable light source is scanned/varied. The assembly for chromatic confocal spectral interferometry or for spectral domain coherence tomography may be configured as a single-shot system (sensor) with a single-shot two-beam interferometer. Alternatively, the assembly may be a scanning type assembly having a scanning imaging two-beam interferometer.

A multiple (i.e. two, three, four, etc.) axial splitting of foci in the interferometric object arm is performed using a multifocal (e.g. bifocal, trifocal, quattro-focal, etc.) optical component. The term "multifocal component" as used in the present application encompasses both a single optical multifocal element configured to form a plurality of foci and a system comprising a plurality of multifocal elements configured to form a plurality of foci. Under multiple splitting it is understood a splitting into n foci, wherein n is an integer equal or greater than two (n>=2).

The multifocal component may have a variable refractive power (for a reference wavenumber), which is configured/selected such as to produce, in combination with the imaging system, n foci corresponding to the n spectral components with the n-discrete design wavenumbers $k\_des\_1$, $k\_des\_2$, $k\_des\_3$, $k\_des\_n$, wherein the n foci corresponding to the n spectral components with the n-discrete design wavenumbers $k\_des\_1$, $k\_des\_2$, $k\_des\_3$, $k\_es\_n$ coincide in at least one confocal point, cPS, in an object space of the assembly. In other words, the at least one multifocal component is designed/configured with respect to its refractive power such that the foci of the imaging system coincide in at least one confocal point of the system (of the setup) cPS in the object domain for then discrete design wavenumbers $k\_des\_1$, $k\_des\_2$, $k\_des\_3$, $k\_des\_n$ . . . , and confocal multi-foci, consisting of exactly n single foci each with light of exactly n different discrete design wavenumbers, are formed.

As mentioned above, the multifocal optical component may be a single multifocal optical element (such as a single multifocal diffractive optical element) or a system comprising a plurality of optical elements, each having a different refractive power (with respect to a reference wavenumber), being selected such as to produce, in combination with the imaging system, n foci corresponding to the n spectral components with the n-discrete design wavenumbers, which coincide in at least one confocal point (cPS) in the object space of the assembly.

By employing a multifocal optical component, at least two, three or several (i.e. n, n>=2) groups of chromatically split foci form in the depth of the object space with a color gradient/change. According to the invention, at least two, three or even more (i.e. n>=2) always differently colored foci of different groups of foci corresponding to the design wavenumbers coincide (at least approximately) in at least one confocal point in the object space of the optical assembly. The confocal point in which the n-different foci corresponding to the n-different design wavenumbers coincide, is the confocal point cPS of the optical system/assembly. As mentioned above, the light source emits light with two different design wavenumbers in at least one or two or even several continuum spectra. The assembly is designed such that the spectral components with the different design wavenumbers always have their focus in the confocal point cPS of the optical system. The confocal multi-focus in the confocal point cPS thus consists of exactly n single foci, each with light of exactly n different discrete design wavenumbers.

Thus, at least two, three or more spectral wavelets are formed in the case of optical scanning of an object measurement point and spectral detection in the wavenumber domain, which wavelets are at least slightly spectrally separated from each other. This results in a significant increase of the amount of detected usable optical primary data in the wavenumber domain and reduces the trade-off of the chromatic confocal spectral interferometry between axial measurement range and depth resolution.

In order to illustrate the above concept, the following exemplary cases is considered:

The multi-spectral illumination light comprises two spectral components, a red and a green spectral component, with predetermined design wavenumbers $k\_des\_1$ (red component) and $k\_des\_2$ (green component), respectively. As explained above, the assembly may be designed such that the focus (red focus) of the red spectral component with a first design wavenumber $k\_des\_1$, coincides with the focus (green focus) of the green spectral component with a second design wavenumber $k\_des\_2$, in the position of the confocal point of the system (setup) cPS. In the general case, the foci of all design wavenumbers $k\_des\_n$, wherein n is an integer equal to greater than 2, coincide in the confocal point of the system (assembly or setup) cPS.

In the above example, the spectral components with the design wavenumbers $k\_des\_1$ (*red*) and $k\_des\_2$ (green) may be embedded in a continuum spectrum or spectra. In this case, an orange-colored focus may coincide with a cyan-colored focus, and a dark red focus may coincide with a yellow focus, but not in the confocal point of the system cPS, since the orange and yellow light (i.e. the orange and the yellow spectral components) do not have the design wavenumbers. Preferably, confocal discrimination of the light returning from the object is carried out. In this way, the spectral components that did not form a sharp focus point on an object point may be excluded from further optical signal formation by employing spatial filtering.

Accordingly, by optical scanning of the object in the depth measurement range (i.e. optical depth scanning of the object measurement point), at least two, three or more spectral wavelets may be generated by interference and detection in the wavenumber domain/space. The generated wavelets cover a particular spectral range (color range), are at least slightly spectrally trimmed and are at least slightly spectrally separated from each other. In the above example with red and green spectral components with corresponding design wavenumbers $k\_des\_1$ and $k\_des\_2$, at least two wavelets may be generated, one wavelet having its center of gravity in the red range and the other wavelet having its center of gravity in the green range.

It is also possible to provide assemblies with trifocal optical components and three distinct design wavenumbers. Such assemblies may produce for example a wavelet with its center of gravity in the red range, a wavelet with its center of gravity in the green range and a wavelet with its center of gravity in the blue range, respectively.

The above description of different examples refers to colors in the visible spectral range, in order to simplify the understanding of the employed principle. However, the invention is not restricted to the visible spectral range, but may be applied to the entire electromagnetic spectrum from the extreme ultraviolet (EUV, for example around 12 nm wavelength) up to the terahertz range. Depending on the degree of chromatic depth splitting, the wavelets can also be located spectrally closer together, e.g. a narrow wavelet with its center of gravity in the dark red next to one with its center of gravity in the light red, without these wavelets overlapping. If more than two wavelets are present, they can be distributed evenly or (somewhat) unevenly in the spectral domain—depending on the spectrum of the light source and formation of foci by the trifocal, quattro-focal or multifocal components with n>4.

The light that falls into the confocal point cPS in the object space of the optical assembly for illuminating and imaging the object is preferably at least approximately diffraction-limited.

The predetermined design wavenumbers may be static (i.e. not change during the operation of the assembly) or may be varied/tuned during the operation of the assembly. Spatial light modulators may be used to tune or vary the design wavenumbers.

The multifocal optical component may be a refractive optical element or a system comprising a plurality of refractive optical elements. Preferably, the multifocal optical component is a diffractive optical element (DOE) or a system comprising a plurality of diffractive optical elements.

For example, to generate multiple, at least partially (e.g. spectrally) separated wavelets, a diffractive optical element with multiple sub-apertures and different refractive powers (with reference to a reference wavenumber) in the sub-apertures may be used. This results in a significant enlargement of the primary optical data obtained in the wavenumber space. Instead of a single, diffractive optical element a plurality of diffractive optical elements (constituting a diffractive optical system) may be employed. For example, different diffractive optical elements may be used for each sub-aperture.

The multifocal diffractive optical element may be static or non-static. Respectively, the multifocal diffractive optical system may comprise static or non-static diffractive optical elements. For example, the diffractive optical element(s) may be a suitably configured fixed diffraction grating with varying refractive power (with respect to a reference wavenumber), for example with varying grating period and/or profile. The diffractive optical system may comprise a plurality of diffraction gratings with different refractive powers (with respect to a reference wavenumber), for example with different grating periods and/or profiles. It is also possible to use variable (non-static) diffractive optical elements, such as computer controllable spatial light modulator(s).

The optical assembly of the spectral interferometer may also be constructed with entirely refractive components, including for example refractive multifocal objectives having a focal position that changes with the wavenumber (as an example of a multifocal optical element or a system). As explained above, also in this case, the refractive multifocal component or a system may be configured for at least two distinct design wavenumbers. In this example, the confocal point cPS is hit at least twice by light of one design wavenumber. For the resulting spectral wavelets, a minimum of non-linearities in the wavenumber domain is desirable, i.e. chirping is preferably minimized. Thus, a numerical correction of the chirping effect be achieved with an acceptable numerical effort.

The proposed assembly having a plurality of spectral components with different design wavenumbers coinciding in a single confocal point, reduces the trade-off of the known chromatic confocal spectral interferometry between the axial measurement range and the depth resolution, which in the prior art is given by the trimming the spectral data using only a single chromatic refractive power of a single (e.g. diffractive) optical element and confocal discrimination. The two or more detected wavelets are preferably substantially in phase, which can be technically achieved by the use of dispersion-free optical systems, such as mirror optical systems and/or diffractive optical components in reflection. In the case of diffractive optical and transmissively used components, preferably only those components are used, whose substrate thickness is compensated for by a compensation plate of the same material and at least approximately the same thickness arranged in the interferometer.

In the case of dispersion-free assembly with multifocal (e.g. bifocal, trifocal, etc.) optical components, the numerical evaluation of the wavelets is comparatively simple, since the wavelets are in phase in the spectral domain. From the detected wavelets, it is possible to either calculate the tan (alpha) as the quotient of the absolute phase shift delta_phi over the detected spectral wavelets and the associated wavenumber difference delta_k, or, especially in the case of the SD OCT, the Fourier transform by a fast Fourier transformation (FFT) over the spectral data, in order to respectively determine the optical path difference xp for a measurement point in the manner known to the skilled person. From the determined optical path difference xp, the depth position of the measurement point may be obtained using knowledge of the interferometric assembly (optical set-up).

Preferably, in the assembly, a mirror objective for optically scanning the object is used because such mirror objective is free from dispersion. A Schwarzschild objective is preferably used for optically scanning the object. Preferably, all further components in the optical path from the (effective) light source to the confocal discriminator (i.e. in the object and reference optical paths) are always mirror optical systems. Alternatively, optical components in the object and reference optical paths are always designed with the same substrate and with substantially identical geometrical thicknesses. Preferably, the confocal point in the object space is a point on the optical axis of the Schwarzschild objective.

The foci imaged by the optical assembly in the confocal point cPS in the object space are preferably at least approximately diffraction-limited. This also applies to the foci formed by diffraction, at least on and in the immediate vicinity of the confocal point in the object space.

To perform spectral measurements (for example depth measurements by performing a spectral scan), the assembly may comprise a spectrometer arranged at the output of the interferometer. In this case the detector assembly may comprise a rasterized detector. It is also possible to employ a tunable light or radiation source with varying wavelength/wavenumber that can be scanned or swept within a certain wavelength range. Thus spectral interferometry without a spectrometer may be carried out. The tunable light or radiation source may comprise a tunable infrared quantum cascade laser or may be a tunable terahertz radiation source. To this end, it is advantageous to employ a spatially coherent radiation source. With such an arrangement, swept-source spectral domain OCT, also known as swept-source Fourier domain OCT, can be carried out, in particular in the infrared and terahertz range. Particularly when using fast swept-source sources, preferably an x-y scanner can be arranged downstream of a Schwarzschild objective in order to obtain an image, so that an area or volume detection of the object is possible.

The multispectral electromagnetic radiation source (light source) may also be a frequency comb source, preferably a tunable frequency comb source. This allows a full-area scanning of the object without having to use mechanically moved components in the assembly. The multifocal light source may also be designed with a Fabry-Perot interferometer or resonator, which may also be tunable. This also allows a full-area scanning of the object without having to use mechanically moved components in the assembly.

The source of electromagnetic radiation (light source) may be a point light source. In this case, the assembly may be used as a point sensor. For example, the source of electromagnetic radiation may comprise a single-mode fiber and/or a pinhole. The output end of the single-mode fiber or the pinhole may serve as an "effective" light source (in this case point light source). Further, the output end of the single-mode fiber or the pinhole (when the illumination is accomplished via a pinhole) may serve as a confocal discriminator. The confocally discriminated light enters a spectrometer, which may preferably be a single-shot spectrometer, for the registration of wavelets. In case of a dispersive spectrometer, the slit of the dispersive spectrometer can also at least partially assume the task of confocal discrimination.

Preferably, a single multi-spectral point light source is used for a point sensor, preferably in a mirror arrangement. However, it is also possible to use an ensemble of several multi-spectral point light sources of approximately the same spectrum, which may be arranged such as to be somewhat spatially separated from a mirror optical system. The multi-spectral point light sources may be arranged in an array, grid or in any other suitable pattern. For example, the multi-spectral point light sources may form a preferably quadratic 2×2 assembly. In this case, there are 4 confocal points in the object space of the assembly, one for each multi-spectral point light source. However, it is also possible to form a 3×3 or a 4×4 or an NxN arrangement (with N>4). In the latter case, there are NxN confocal points in the object space of the assembly. Such point light sources generally have low filling degree or level, usually a filling degree of far less than 10%. Often, the filling level is only 1% or a few percent. Thus, the object can be scanned point by point and the crosstalk may be minimized. For example, the optical scanning of the object may be carried out exactly in the grid/raster of the point light source configuration, but according to a predetermined imaging scale (magnification) factor, preferably greatly reduced. Each individual measurement point is preferably assigned its own single-shot spectrometer or its own channel of a multi-channel spectrometer.

If mirror components and systems are employed in an interferometer with splitting of the wavefront (for example by using a comparatively small central mirror in a mirror objective, preferably a Schwarzschild objective, for the reference optical path), confocal discrimination may be necessary or advantageous, in order to mitigate crosstalk. Similarly, in an arrangement with several slightly separated multi-spectral spot light sources and mirror assemblies with splitting of the wavefront (for example by a comparatively small central mirror or a mirror objective), preferably confocal discrimination is implemented. The reason for confocal discrimination is that the effective numerical apertures for the reference and object light are different. Usually, the lateral expansion of the Airy spots of the reference light is larger than the lateral expansion of the Airy spots of the object light. Accordingly, without confocal discrimination crosstalk to neighboring channels may occur. The implementation of confocal discrimination is particularly advantageous in in the case of translucent objects, such as biological tissues. On the other hand, assemblies with splitting of the wavefront, in particular by a preferably comparatively small central mirror have a simple optical set-up and are thus comparatively inexpensive.

The assembly may comprise a mirror objective arranged in the interferometer for illuminating and imaging at least one single object point of the object, such as a Schwarzschild objective. A Schwarzschild objective includes a primary mirror with a center region, which is usually not used for object illumination, and a secondary mirror for illumination and imaging at least one point of the object. The confocal point of the system (of the setup) cPS may be at least approximately on the optical axis of the Schwarzschild objective.

In an arrangement with a Schwarzschild objective, a central area of the primary mirror of the Schwarzschild objective, which in standard application is typically not used, may be configured or designed or modified such as to couple and/or decouple the reference light. For example, the Schwarzschild objective may be modified by forming or providing a plane or concave mirror surface in the usually unused center region of the primary mirror, downstream (i.e. downstream in a direction of propagation of reference light) of which the end reflector is arranged. The usually unused center region of the primary mirror may relate to an annular region around the optical axis of the Schwarzschild objective. The diameter of the center region may be selected depending on the specific application. The mirror surface or mirror has a curvature which is different from the curvature of the primary mirror. The mirror surface or mirror may be formed integral/in flush with the surface of the primary mirror or at a distance, i.e. standing out, from the surface of the primary mirror of the Schwarzschild objective.

It is also possible to employ a modified Schwarzschild objective having a through-opening formed into the usually unused center region of the primary mirror. A plane or concave mirror is arranged downstream of the trough opening in the reference optical path. In a standard representation of a Schwarzschild objective, the mirror may be arranged "below" below the primary mirror, i.e. on the side of the primary mirror which is away from the secondary mirror(s).

In the above assemblies employing a modified Schwarzschild objective, the numerical aperture of the reference optical path is always smaller than the numerical aperture of the object optical path. Accordingly, confocal discrimination (confocal gating) is preferably employed, in particular if the objects to be measured are multilayer objects, such as biological objects.

If, on the other hand, a mirror assembly in an interferometer with splitting of the wavefront is formed in particular by a multi-aperture assembly or assemblies and the reference and the object wavefronts (respectively the reference and object optical paths) have approximately the same numerical aperture, the requirements for the separation of the spot light sources are alleviated and, in an extreme case, confocal discrimination may be dispensed with completely.

Confocal discrimination can be also dispensed with in an interferometer with partition of the amplitude, in particular if the objects to be measured are one-layer objects, such as compact (bulky) materials and finely machined metal surfaces. Examples of interferometers with splitting of amplitude are Michelson, Twyman-Green-Mirau or Linnik interferometers, in which multifocal optical components (e.g. which bifocal, trifocal, etc.) are arranged in the object optical path in order to generate at least two foci chains in the object space with a color gradient/change in the depth, also known as chromatic depth splitting. Thus, it is possible to construct single-shot measuring assemblies that operate with a line spectrometer (for example from the Finnish company SPECIM) wherein at the input of the line spectrometer a one-dimensional spatial filtering of the detected measuring light is carried out.

If no single-shot measurement method is required, it is possible to employ two-dimensional (surface) light source, in particular in conjunction with a Michelson, Twyman-Green-Mirau or Linnik interferometer. In this case the determination of the spectra of two-dimensional data using two-dimensional multi-spectral light sources can be performed by hyperspectral imaging. Preferably, imaging-Fourier spectrometers can be used in such cases. These can be operated both in a scanning way and as single-shot interferometers. In the latter case, the single-shot interferometer may comprise an input slit or an input line aperture, which enables the evaluation of a whole line or several measurement points arranged in the line in one shot. An example of such interferometer is described in the document U.S. Pat. No. 8,934,104 B2. The use of tunable or adjustable light sources in connection with rasterized image detectors, such as CMOS cameras, is also possible.

In each of the above-described cases, at least one multifocal (e.g. bifocal, trifocal, etc.) optical component is arranged in the object optical path in the spectral interferometer in order to produce in the object space at least two foci chains with a color gradient/change in the depth.

If there is at least one component having dispersion or if a residual dispersion exists, for example to the use of refractive components, the known chirping, represents a frequency change, occurs in the wavelet signal. This non-linearity (i.e. the chirping) typically requires a phase correction before calculating of a Fourier transform, for example by fast Fourier transformation (FFT). In the case of a mechanically stable setup, the chirping can be regarded as a constant influence over the wavenumber and, after calibration of the measuring assembly, can be calculated and compensated with. Such calculation may, however, require considerable computation time and resources.

A further aspect of the invention relates to a method for chromatic confocal spectral interferometry, in particular also in the single-shot operation, for detecting distance, depth, profile, shape, ripple and/or roughness or the optical path length in or on technical or biological objects, or for spectral domain coherence tomography (SD-OCT). In each case at least one measurement point of the object to be measured is measured. The method employs an assembly for chromatic confocal spectral interferometry or for spectral domain coherence tomography (SD-OCT), which may be the above described assembly according to an aspect of the invention.

In particular, the assembly may comprise:
a source of electromagnetic radiation for illuminating at least one measurement point of an object with light comprising at n spectral components having n discrete predetermined wavenumbers defined as design wavenumbers, wherein n is an integer equal or greater than two;
an interferometer (e.g. a spectral interferometer) having a chromatic object optical path including the at least one measurement point and an achromatic reference optical path, in which an end reflector is arranged;
an optical imaging system for illuminating and imaging at least one single object point of the object;
a detector assembly for detecting electromagnetic radiation in the form of at least one spectral wavelet, and
a multifocal optical component arranged in the object optical path and assigned to the imaging system, According to the proposed method, for a number of two, three, four or even more discrete design wavenumbers, respective double, triple, quadruple or multiple foci are formed in the object space by optical bifocal, trifocal, quattrofocal or even higher number multifocal optical component in the object arm of the spectral interferometer, which foci are confocal, i.e. which coincide in at least one confocal point of the system (of the setup) cPS always in at least an approximate manner. Thus, the method comprises forming n foci corresponding to the n spectral components with the n-discrete design wavenumbers, wherein the n foci corresponding to the n spectral components with the n-discrete design wavenumbers coincide in at least one confocal point cPS in the object space of the assembly;

The focus position, depending on the wavenumber, i.e. the focal length variation as a function of the wavenumber, represents thus an alternating function with at least two passages through the confocal point of the system/assembly (i.e. of the setup) cPS. This function preferably has a sawtooth characteristic, i.e. is a sawtooth function. The sawtooth function has preferably long linear ascending branches. As explained above, such function can be realized by multifocal (e.g. bifocal, trifocal, quattrofocal, etc.) diffractive optical elements with sub-apertures for the individual design wavenumbers or by a complex holographic element.

In contrast to diffractive optical systems, refractive multifocal (e.g. bifocal, trifocal, etc.) optical systems can only approximate such "sawtooth" function. Furthermore, refractive objectives usually also produce non-linearities in the form of chirping in the wavelets due to the dispersion in the optical system. This often results in significant signal evaluation problems and also requires higher computing power.

The discrete design wavenumbers may be a part of a common continuum spectrum, or each individual discrete design wavenumber may belong to its own continuum spectrum. The light of the wavenumbers from the continuum spectrum, which is different to the design wavenumbers may form chromatically depth-split foci, which, however, do not fall into (i.e. coincide with) the confocal point of the system cPS, since this point cPS is only hit by light of the design wavenumbers.

At least two wavelets are detected by the detector assembly, for example by employing a spectrometer or a tunable light source with wavelength scanning.

Furthermore, in the method for chromatic confocal spectral interferometry, the following condition shall apply to the amount of the optical path difference xp in the interferometer:

$$2/k^*\_\min < |xp| < 10.000 k^*\_\min.$$

Here, $k^*$ is defined with $k^*=1/\text{lambda}$.

This enables reliable spectral evaluation for this wavelength (wavenumber) range.

In the method for chromatic confocal spectral interferometry, the detected wavelets preferably each include exactly light of one of the discrete design wavenumbers. Each wavelet is, therefore, preferably always formed by light of exactly one discrete design wavenumber.

As described above, the chromatically depth-split foci may be formed by light-diffracting components. Preferably, confocal discrimination of the light coming from the object is carried out by suitable optical components (such as pinhole, apertures, etc.) prior to the spectral analysis by a spectrometer and/or the detection by the detector.

In an example, by employing the multi-range spectral interferometry described above, a plurality of foci of different colors (all lying within a predefined spectral range such as the visible spectral range) are simultaneously formed in the confocal point of the system (of the setup) cPS. For example, in the bifocal case, two foci of different color are simultaneously formed in the object optical path of the spectral interferometer or the SD-OCT system by for example employing diffractive optical elements. The formed two or more foci correspond to a depth position in the object space.

Furthermore, information from the envelope evaluation of the spectral signals (i.e. analysis of the wavelet envelop), such as their position in the spectrum, can preferably be used at least as an "estimator" for the determination of the absolute phase shift delta_phi over the detected spectral wavelets and thus also for checking the freedom from contradictions of the calculated data.

For SD-OCT, a FFT (Fast Fourier Transform) may be performed over the entire range of the detected spectral signal above a certain modulation threshold in the wavenumber domain, which may consist of several separate or at least partially overlapping wavelets. The modulation threshold may selected such that the signal noise is filtered out and do not disturb the signal processing.

Preferably, two or more wavelets are generated in phase in different wavenumber ranges. This greatly facilitates the evaluation, since complex corrective calculations can be largely omitted.

The axial measurement range corresponds to at least twice the wave-optical depth of field, DOF, at the largest wavenumber k*, which results from the numerical aperture of the objective for the object image.

These and other aspects will now be described in detail with reference to the following drawings and examples without figures, wherein:

FIG. 11A shows schematically an exemplary imaging system with a trifocal diffractive optical element;

FIG. 11B shows schematically an exemplary trifocal diffractive optical element;

FIGS. 12A and 12B show exemplary trifocal diffractive optical elements;

FIG. 13A shows an exemplary diffractive optical element for a first design wavenumber;

FIG. 13B shows an exemplary diffractive optical element for a second design wavenumber;

FIG. 13C shows an exemplary diffractive optical element for both the first and the second design wavenumber;

FIG. 166 shows the detected wavelets in case of triple focus,

Figure 1:
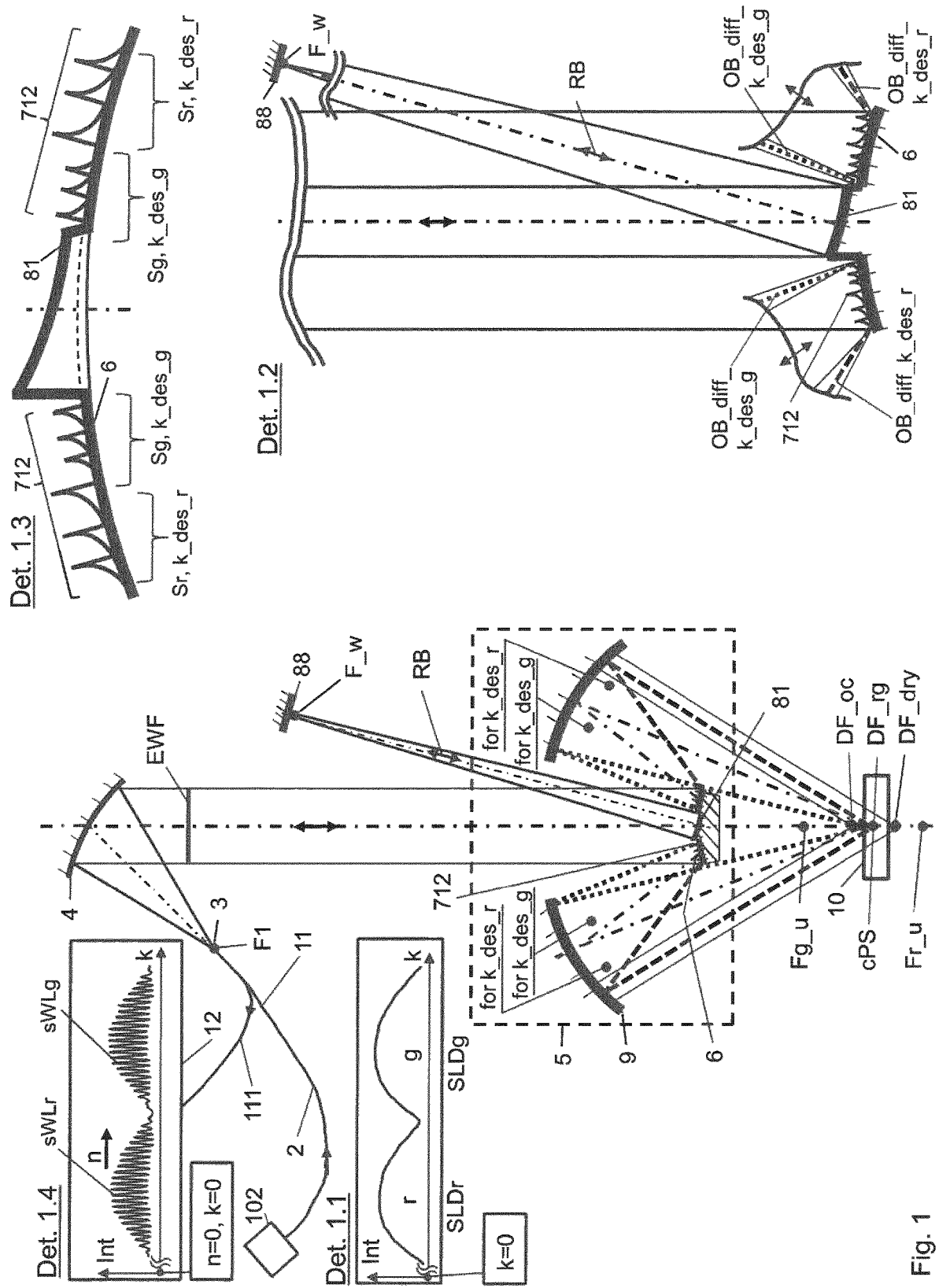
FIG. 1 shows schematically an exemplary assembly with a dispersion-free set-up for chromatic confocal spectral interferometry with splitting of the wavefront.

FIG. 1 illustrates an assembly with a dispersion-free system for chromatic confocal spectral interferometry with splitting of the wavefront. The light emanating from a fiber-coupled double light source 102 with two integrated broadband superluminescence diodes SLDr and SLDg in the green and red spectral ranges passes through the single-mode fiber 2 into the focus F1 of an off-axis rotary paraboloid mirror 4. The wavenumber spectrum of the double light source 102 is shown in detail 1.1. The light bundle from the entire light spectrum of the double light source 102, is collimated at the off-axis rotary paraboloid mirror 4 (plane wavefront), propagates into a Schwarzschild objective 5, where it reaches the convex primary mirror 6 of the Schwarzschild objective 5. A bifocal annular diffractive optical element 712, which operates in reflection, is provided in the outer radial region of the convex primary mirror 6. The center annular region of convex primary mirror 6 is free, i.e. does not have a diffractive optical element applied to it. In the central region, a concave off-axis coupling mirror 81 is provided. The coupling mirror 81 splits off a part from the wavefront impinging on the primary mirror 6 and reflects it into the reference optical path to form the reference beam or bundle RB. The central axis of the reference bundle RB is inclined with respect to the optical axis of the Schwarzschild objective 5. Thus, by splitting of the incoming wavefront by the concave coupling mirror 81, the reference beam bundle RB reaches the reference optical path and is focused there onto the miniaturized plane mirror 88, where it forms an achromatic focus F_achr, which can also be referred to as a white focus F_w. The reference beam bundle RB is further reflected at the plane mirror 88, as shown again in detail 1.2. The reference light returning from the plane mirror 88 is again reflected at the concave coupling mirror 81, which now acts is a coupling mirror and, after being focused by the off-axis rotary paraboloid mirror 4, reaches the end 3 of the single-mode fiber 2 and is coupled into the spectrometer 12 at the Y-switch, where it interferes with the object light on the spectrometer elements (not shown in detail here).

The light coming from the off-axis rotary paraboloid mirror 4 and incident onto the outer region of the convex primary mirror 6 and thus onto the bifocal annular diffractive optical element 712, where it is diffracted as shown in detail 1.2.

The annular diffractive optical element 712 operates in reflection. Here, the bundles shown in dashed lines represent the beam path in the Schwarzschild objective 5, for which the Schwarzschild objective 5 is designed in a diffraction-limited manner, i.e. is at least approximately free from geometric-optical imaging errors on the optical axis.

The annular diffractive optical element 712 is a bifocal diffractive optical element composed by two annular substantially concentric sub-elements or sub-apertures having different grating periods, as shown in detail 1.3. Detail 1.3 shows an enlarged view of a part of the optical setup at the convex primary mirror 6 having a reflective bifocal annular diffractive optical element 712 with the two sub-apertures applied thereat. The bifocal annular diffractive optical element 712 operates in reflection and has a negative refractive power. The two sub-apertures have an optimized design for red light of design wavenumber k_des_r and green light of design wavenumber k_des_g. Light of the red design wavenumber is focused into the confocal point cPS of the system. Similarly, light of the green design wavenumber k_des_g is focused into the same confocal point cPS of the system. Of course, instead for red and green light, the optical system may be configured/designed for other distinct spectral components.

After reflection of the diffracted light bundles at the concave secondary mirror 9, chromatically depth-split double foci DF_oc, DF_rg, DF_dry are formed in the object space, as shown in FIG. 1.

In particular, the superluminescence diode SLDr emits light with relatively broad spectrum in the red spectral range with color (spectral) sub-components from dark red to orange. This light passes through the sub-aperture Sr of the annular diffractive optical element 712. Thus, a foci chain from dark red to orange is formed by diffraction in the first diffraction order. Similarly, the superluminescence diode SLDg emits light with relatively broad spectrum in the green spectral range with color sub-components from yellow to cyan. This light passes through the sub-aperture Sg of the annular diffractive optical element 712. By first order diffraction at the sub-aperture Sg of the annular diffractive optical element 712, a foci chain from yellow to cyan is formed. The sub-apertures of the annular diffractive optical element 712 are designed such that the red and the green focus (corresponding to the design wavenumbers red and green) coincide in the center of the depth measurement range and thus form a red-green double focus DF_rg. At the upper end of the depth measurement range of the double-focus chain, the orange-colored and the cyan-colored focus also coincide and thus form the double-focus DF_oc. At the lower end of the depth measurement range, the dark red and yellow double focus DF_dry closes the double focus chain.

In addition, light of the superluminescence diode SLDr in the red spectral range also passes through the sub-aperture Sg of the annular diffractive-optical element 712 which is designed for green. By diffraction in the first diffraction order, due to the non-optimal diffractive structures, a single red focus Fr_u, i.e. without a green accompanying focus, is formed above the depth measurement range. This single focus outside the depth measurement range can be recognized as superfluous for the measurement in the spectral analysis and eliminated (filtered out). This single red focus is a part of a focus chain in the colors from dark red to orange.

Furthermore, light of the superluminescence diode SLDg in the green spectral range also passes through the sub-aperture Sr of the annular diffractive optical element 712, which is designed for red. By diffraction in the first diffraction order, due to the non-optimal diffractive structures, a single green focus Fg_u, i.e. without a red accompanying focus, is formed above the depth measurement range. This single focus outside the depth measurement range can also be recognized as superfluous for the measurement in the spectral analysis and eliminated (filtered out). This green focus is part of a focus chain in the colors from yellow to cyan.

However, it is also possible to advantageously use the foci Fr_u and Fg_u for course determination of the depth position of a measurement object, when for example the measurement object is being accessed or positioned in the measuring assembly, or when course scan of the object is performed.

To be noted is that also the frequency of the spectral wavelet(s) sWL provides at least one indication as to the current depth position of an object point. This is all the more so if the assembly is calibrated. Usually, the frequency of a single spectral wavelet sWL can represent a valuable and thus also useful information. This frequency can be determined by an FFT.

The light returning from the object 10 passes again through the sub-apertures of the annular diffractive optical element 712, whereby the light passing through the appropriate sub-apertures according to the design of the annular diffractive optical element 712, passes through the confocal discrimination at the end 3 of the fiber 2 and the Y-switch 11 into the spectrometer 12. Thus, in the case of the depth position of a measurement object in the measurement range, red and green-colored light respectively forms a spectral double wavelet, with an envelope, as shown in detail 1.4. The spectral double wavelet consists of the individual spectral wavelets or bands sWLr and sWLg. These spectral bands are also referred to as Tolansky bands and represent the well-known fringes of equal chromatic order in a channeled spectrum.

When performign measurement, it is possible to distinguish between three main cases, which may occur in the detected spectrum:

Case 1: green-colored focus alone, i.e. the measured object point is positioned above the depth measurement range and the spectral wavelet has its maximum in the green range.

Case 2: red-green double focus, i.e. the measured object point is at least approximately in the center of the measurement range and positioned around the confocal point cPS of the system. In the lower part of the measurement range, the colors of the double focus are shifted to dark red and yellow. In the upper part of the measurement range, the colors of the double focus are shifted to orange and cyan. Two spectral wavelets with a maximum in the red and in the green range are detected.

Case 3: red-colored focus alone, i.e. the measured object point is positioned below the depth measurement range and the detected spectral wavelet has its maximum in the red range.

In an exemplary assembly having the optical set-up shown in FIG. 1, a depth measurement range of +/−25 micrometers, that is a total of 50 micrometers, may be realized. The Schwarzschild objective may have an achromatic focal length of f_achr=10 mm and may be designed for a finite focal length, here for example a focal length of 160 mm. In each case, plane wavefronts are incident on the diffractive optical element 712, which represents a bifocal hyperchromat, which is designed for the wavelengths:

lambda_des_r=625 nm, which corresponds to the wavenumber k_des_r=3.2 Pi/micrometer; and lambda_des_g=555.56 nm, which corresponds to the wavenumber k_des_g=3.6 Pi/micrometer).

Thus, two wavelets are generated in the wavenumber domain, since the light source 102 covers these spectral ranges. The optical path difference xp in the interferometer is 300 μm. The fiber-coupled spectrometer 12 has 4000 sampling points for a spectral range of the wavelengths from 500 nm to 700 nm, so that at least up to 1000 spectral bands can be reliably detected.

The evaluation of the detected spectral wavelets may be carried out in a number of ways, for example by a fast Fourier transformation over the two wavelets in a manner well known to the skilled person in the spectral domain OCT.

It is also possible to determine the value tan(alpha) from the quotient delta_phi over delta_k according to the approach shown in FIGS. 8a to 8d. The value tan(alpha) corresponds to the optical path difference xp in the spectral interferometer. FIGS. 16a to 16d show the case for a trifocal assembly, in which three spectral wavelets can be detected.

In a further modification 1 without a figure, a diffractive optical element with annular sub-apertures, which operates in reflection is applied to the secondary mirror 9, as a substitute for the diffractive optical element on the convex primary mirror 6. This also represents a possibility of chromatically splitting foci in the depth.

In a further modification 2 without a figure, an additional diffractive optical element is arranged on the secondary mirror 9 or the purpose of correcting aberrations of the Schwarzschild objective 5 and the diffractive optical element with annular sub-apertures on the primary mirror in the focus formation.

Figure 2:
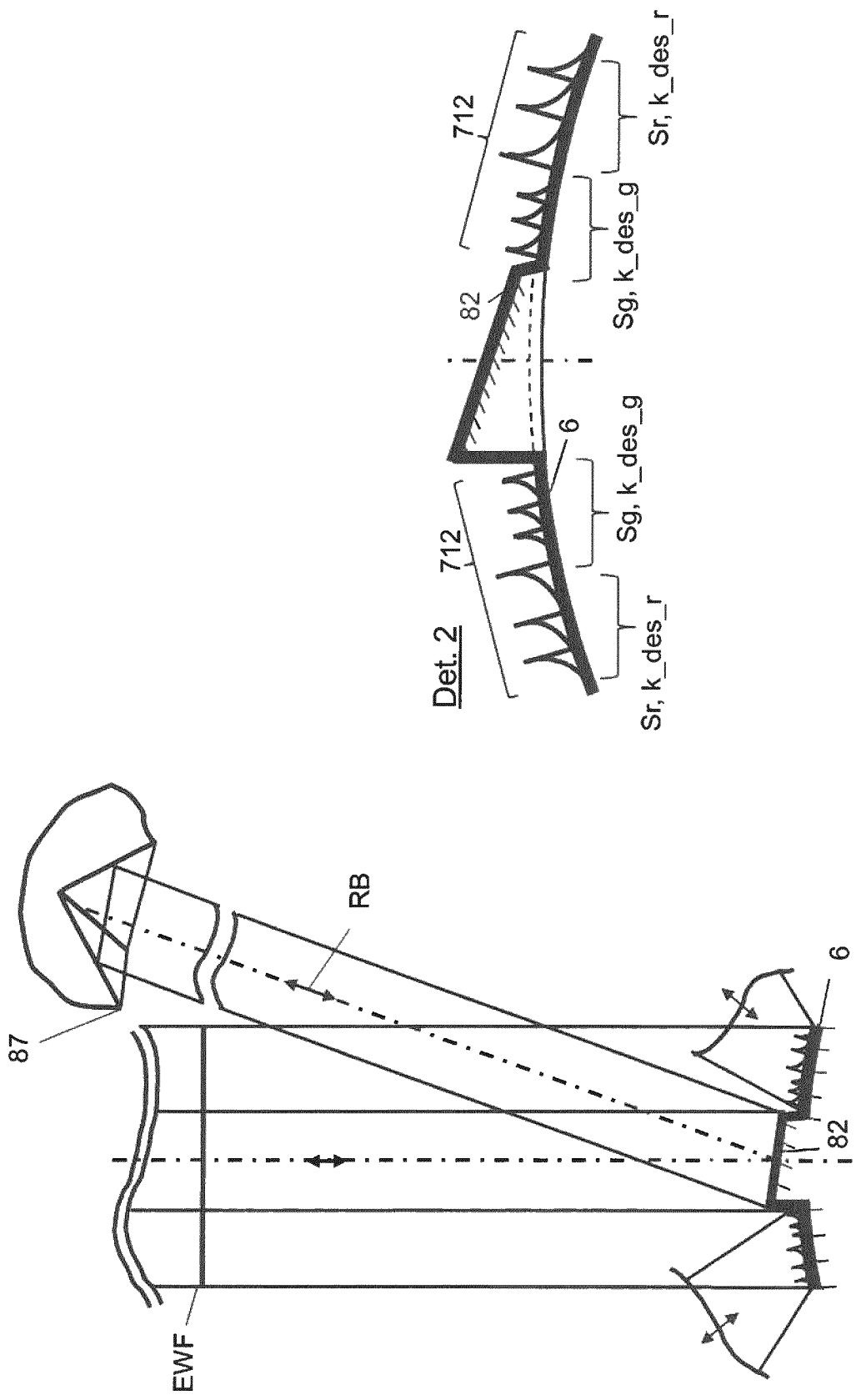
FIG. 2 shows schematically another exemplary assembly with a dispersion-free set-up for chromatic confocal spectral interferometry with splitting of the wavefront.

FIG. 2 illustrates another exemplary assembly with a dispersion-free system for chromatic confocal spectral interferometry with splitting of the wavefront. In this assembly, the input wavefront EWF is a plane wavefront. The reference beam bundle is decoupled from the plane input wavefront EWF by splitting of the wavefront by a plane coupling mirror 82. More specifically, the coupling mirror 82 reflects an inner annular portion of the plane input wavefront EWF to form the reference beam bundle. The coupling mirror 82 is provided in the central region of the primary mirror 6 of the Schwarzschild objective 5 and is positioned at a distance from the surface of the primary mirror 6. The coupling mirror 82 may for example be carved out by single-point diamond turning and is surrounded by the primary mirror 6 of the Schwarzschild objective 5. The reference beam bundle is reflected back the on a triple mirror reflector (hollow cube reflector) 87 positioned in the reference optical path and serving as a reference end reflector.

The outer annular portion of the plane input wavefront EWF undergoes diffraction in the first order by a bifocal annular diffractive optical element 712 provided on the primary mirror 6 and having two adjacent sub-apertures designed for a first and a second design wavenumbers, respectively. In the specific example, the first design wavenumber is in the green spectral region (green design wavenumber) and the second design wavenumber is in the red spectral range (red design wavenumber). The diffractive optical element 712 works in reflection and has a negative refractive power. Detail 2 shows an enlarged view of the bifocal annular diffractive optical element 712 and the sub-aperture region Sr for red light and the sub-aperture region Sg for green light.

Figure 3:
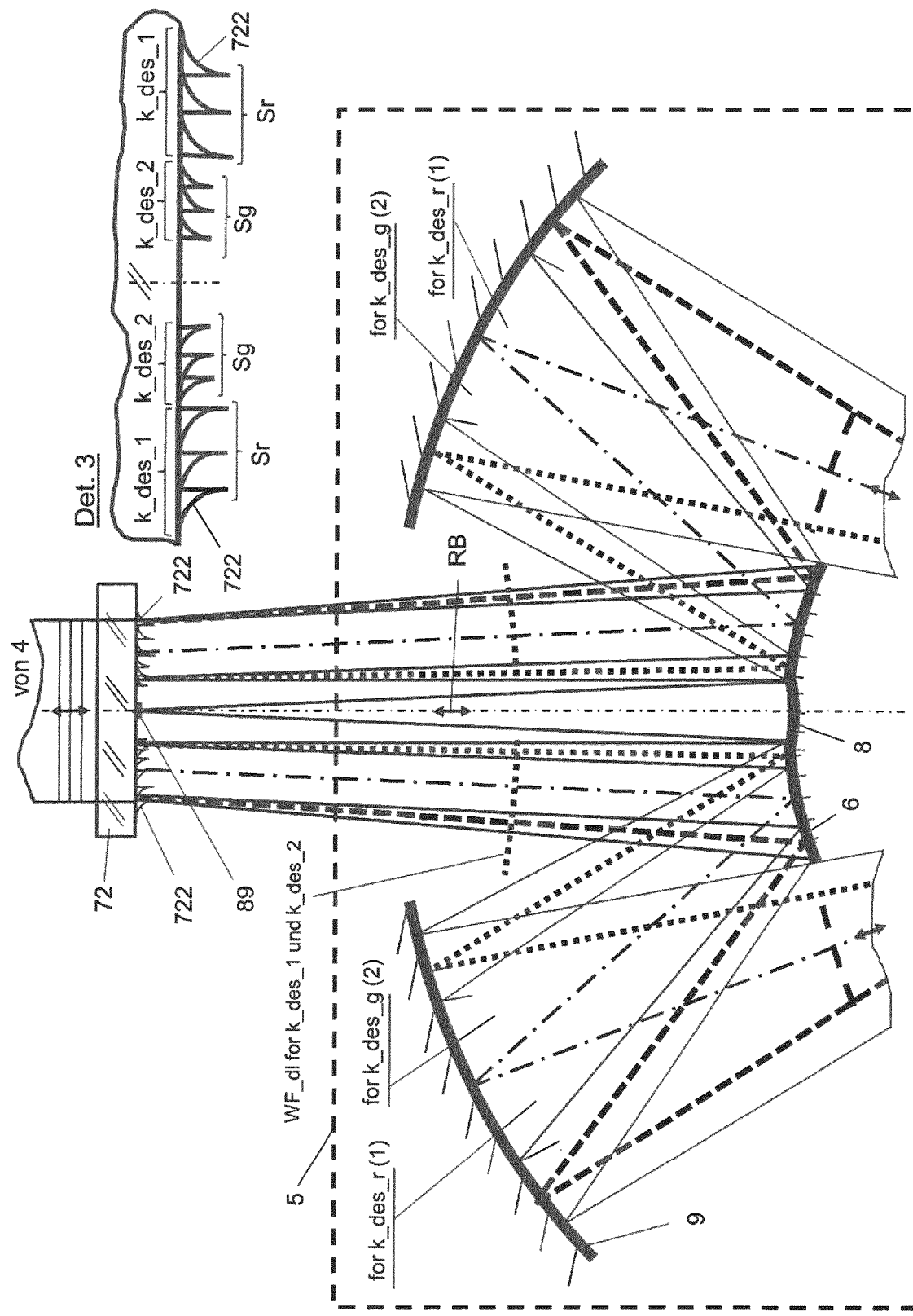
FIG. 3 shows schematically a dispersion-free CCSI system with splitting of the wavefront.

FIG. 3 illustrates a dispersion-free CCSI assembly with splitting of the wavefront. The assembly comprises a Schwarzschild objective 5 and a bifocal annular diffractive optical element 722 arranged upstream of the Schwarzschild objective 5. A central radial portion of the bifocal annular diffractive optical element 722 is substantially free from diffractive elements for a portion of the incoming wavefront that corresponds to the reference beam bundle RB to pass through it without diffraction. In the center of the bifocal annular diffractive optical element 722 a micro-reflector 89 for reflection of the reference bundle RB is arranged. The micro-reflector 89 is a miniaturized plane mirror having a diameter of 0.5 mm. The micro-reflector 89 is positioned coaxially with respect to the optical axis of the Schwarzschild objective 6 and serves as a reference end mirror/reflector.

A concave on-axis coupling mirror 8 is arranged in the central region of the primary mirror 6 of the Schwarzschild objective 5. The concave on-axis mirror 8 decouples and couples reference light and forms a focused reference beam bundle RB. The coupling mirror 8 effects splitting of the input wavefront EWF and is preferably arranged coaxially with respect to the optical axis of the Schwarzschild objective 5.

For the wavefront WF_dl, the Schwarzschild objective 5 is designed in a diffraction-limited way to form foci on the optical axis. The wavefront WF_dl belongs to the beam bundle depicted in bold in FIG. 3, which is formed by diffraction (example first-order diffraction) on the bifocal annular diffractive optical element (DOE) 722 both for red design wavenumber (k_des_r) in the red-optimized sub-apertures and for green design wavenumber (k_desg) in the green-optimized sub-apertures.

For example, an annular diffractive-optical element 722 may be designed/calculated and manufactured such that, there is one optimized design wavenumber (k_des_r) in the red spectral region and exactly one design wavenumber (k_des_g) in the green spectral region. Each design wavenumber corresponds thus to or forms one diffracted wavefront, which in the object space then leads to a double focus DF_rg with red and green light in the confocal point cPS in the object space of the system/assembly. Detail 3, shows an enlarged view of the diffractive optical element 722 comprising exactly one sub-aperture for red and for green light, respectively. This is one simple option to generate double foci.

Figure 4:
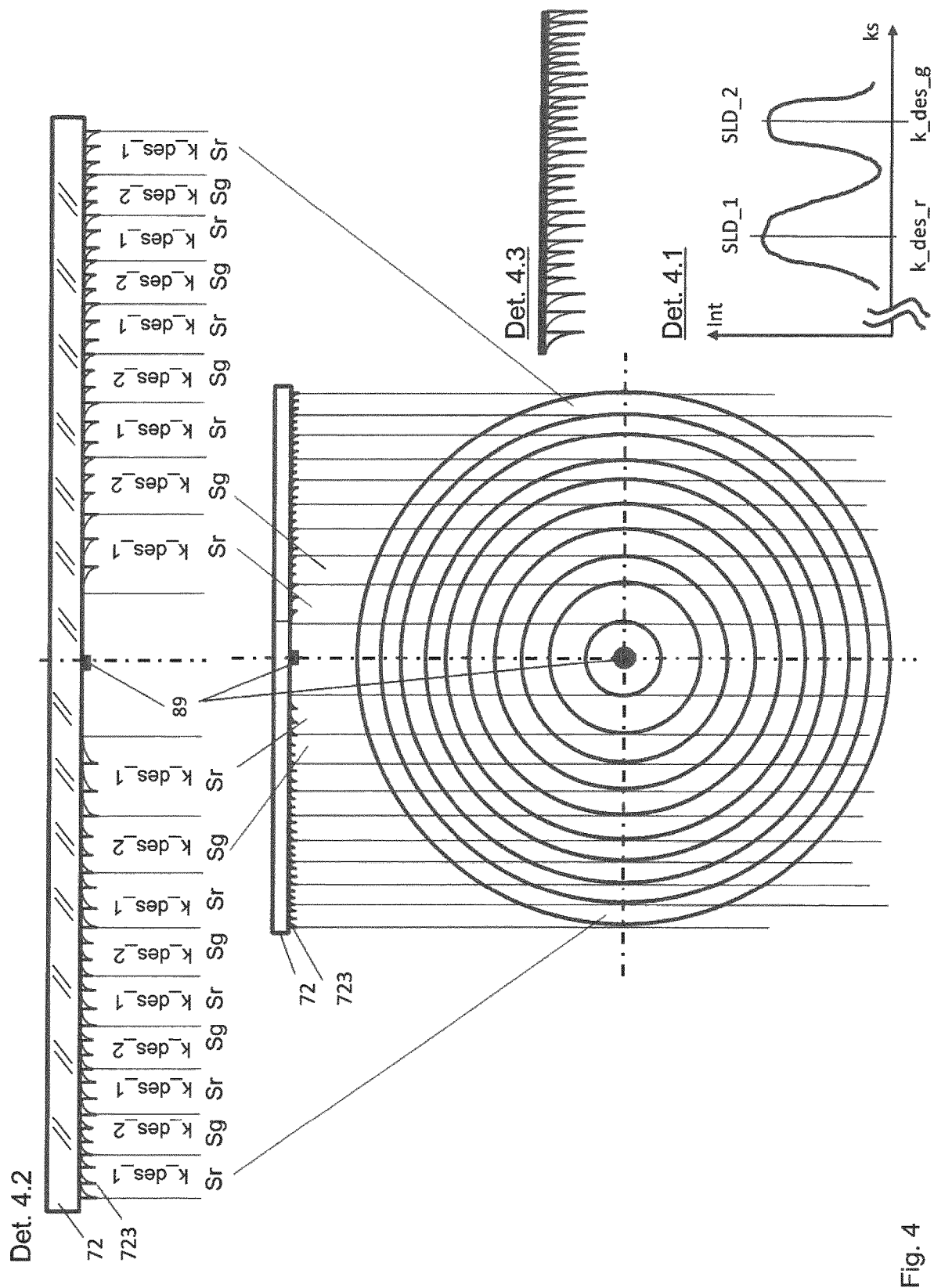
FIG. 4 shows an exemplary bifocal diffractive optical element.

FIG. 4 illustrates a bifocal diffractive optical element 723 in the form of a circular ring on a substrate 72. Detail 4.2 shows an enlarged view of the diffractive optical element 723 and Detail 4.3 shows a side view of the diffractive optical element 723 (which may not be up to scale). The bifocal diffractive optical element 723 comprises a plurality of annular, ring-form concentric sub-apertures or portions having diffractive structures and a central area, which is a substantially free from diffractive structures. At the center of the central area, there is arranged a miniaturized plane mirror 89, which serves for the reflection of the focused reference light. The bifocal diffractive optical element (DOE) 723 with the miniaturized plane mirror 89 can be used in the assembly shown in FIG. 3.

The sub-apertures of the bifocal diffractive optical element 723 are each optimized for one of two distinct design wavenumbers, since light with two design wavenumbers k_des_1 (k_des_r) and k_des_2 (k_des_g) is used. For example, the period and/or profile height of the diffractive structures in each of the sub-apertures of the diffractive optical element 723 may be adapted to the respective design wavenumber, as illustrated for example in Detail 4.3.

In particular, the diffractive structures in each of the sub-apertures may be configured/designed such that the radii of the wavefronts of the light with the design wavenumbers k_des_r and k_des_g are at least approximately equal after passing through the diffractive optical element 723 and thus upon entering the Schwarzschild objective 5. Detail 4.1 shows the wavenumber spectrum of the light source.

Figure 5:
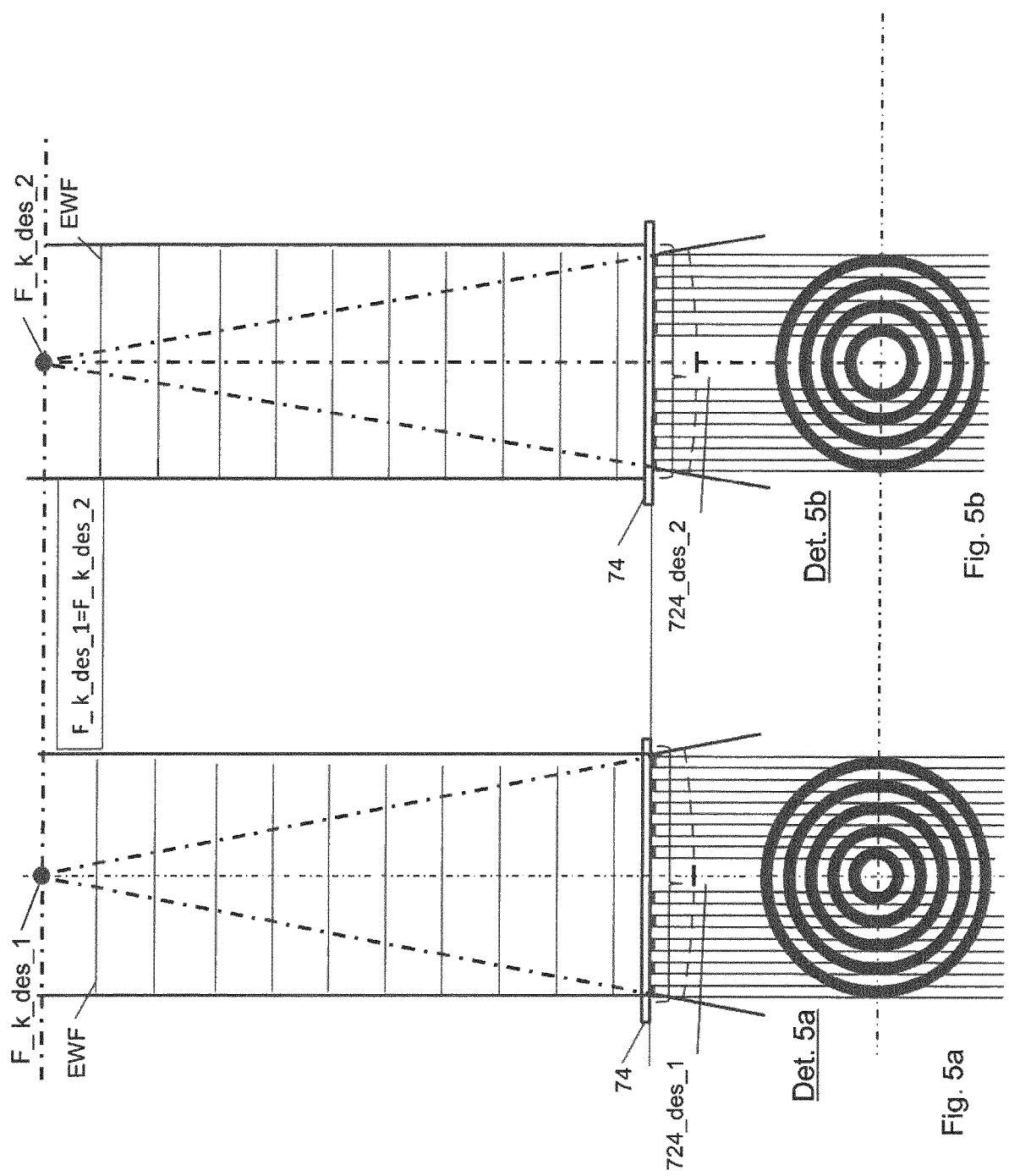
FIGS. 5a and 5b illustrate the operating principle of a bifocal diffractive optical element.

FIGS. 5a and 5b illustrate the operating principle of a bifocal diffractive optical element, such as the one shown in FIGS. 3 and 4 for two design wavenumbers in the green and the red spectral range, i.e. for red and green light, respectively.

The operating principle of the bifocal diffractive optical element is as follows: The bifocal diffractive optical element is designed such that the radii of the wavefronts with spectral centroids k_des_1 and k_des_2 (k_des_n) are at least approximately equal upon entering the Schwarzschild objective. The Schwarzschild objective 5 in FIG. 3 is designed exactly for this radius of the incoming WF and is diffraction-limited.

FIG. 5a shows red light of the design wavenumber (k_des_1) as a plane wave, which impinges on the bifocal diffractive optical element 723, is diffracted by the sub-apertures designed for red light and forms the virtual focus F_k_des_1. Detail 5a shows the bifocal diffractive optical element 724_des_1 and the sub-apertures designed for red light with the wavenumber k_des_1. DOE areas, i.e. sub-apertures, are coarser for k_des_1 (red). They form the diffractive optical element 724_des_1, a phase zone lens, with negative focal length (−)f. It should be noted that only the wavefront of interest is illustrated here.

FIG. 5b shows green light of the wavenumber (k_des_2) as a plane wave, which impinges on the bifocal diffractive optical element 724_des_2 and is diffracted by the sub-apertures designed for green light and forms the virtual focus F_k_des_2. Detail 5b shows the bifocal diffractive optical element 724_des_2 and the sub-apertures designed for green light with the wavenumber k_des_2. As shown in detail 5a, only the section of the wavefront of interest is illustrated here. The sub-apertures are finer for k_des_2 (green) in the diffractive-optical element 724_des_2. These sub-apertures form a diffractive optical element, a phase zone lens, with exactly the same negative focal length (−)f as for red light (k_des_1).

The focus points F_k_des_1 and F_k_des_2 coincide in an exact fashion. The Schwarzschild objective 5 is designed in a diffraction-limited way geometrically-optically for imaging of the confocal point cPS of the system. The focus points F_k_des_1 and F_k_des_2 coincide with the confocal point cPS.

The assembly shown in FIG. 3 also works in conjunction with a triple mirror reflector (hollow cube reflector) 87 and a plane coupling mirror 82. Here, only the respective wavefront of interest is shown.

Figure 6:
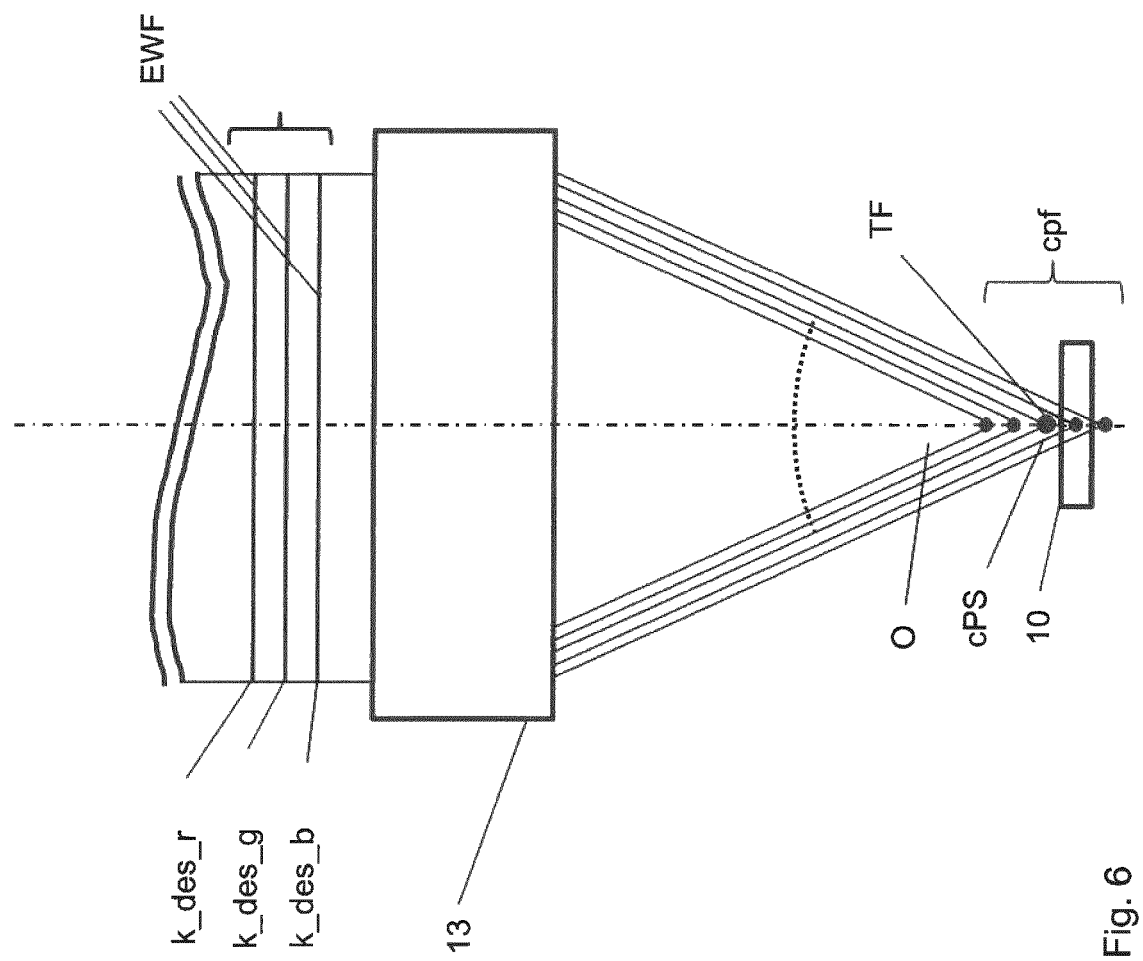
FIG. 6 illustrates the principle of forming a triple focus in the confocal point cPs.

FIG. 6 illustrates the principle of forming three focal points coinciding in the confocal point cPS of the system (assembly), i.e. of forming a triple focus in the confocal point cPS. The assembly comprises a spectral interferometer 13 comprising a trifocal diffractive optical element having a negative power. Symbolically, three plane waves with the design wavenumbers k_des_r (i.e. k_des_red), k_des_g (i.e. k_des_green) and k_des_b (i.e. k_des_blue), which come from a mirror collimator not presented here, are shown. The trifocal diffractive optical element 13 in the spectrometer 13 generates a triple focus (red, green, blue) in the confocal point cPS of the system for the light with the three design wavenumbers k_des_r, k_des_g and k_des_b. Light with wavenumbers above and below the design wavenumbers forms chromatically depth-split foci. Thus, the foci of the three design wavenumbers k_des_r, k_des_g and k_des_b belong to respective chains of foci, namely a red-chain, a green-chain and a blue-chain.

In the case of the formation of a trifocal optical system with sub-apertures for the individual design wavelengths/ wavenumbers, there are always foci that come from a wrong sub-aperture, i.e. the sub-aperture which it is not designed or optimized for this wavelength/wavenumber.

However, if confocal discrimination is employed, these "wrong" or undesirable foci can only contribute to the detected signal if the measurement point is outside the depth measurement range. The contribution from the "wrong" (undesirable) foci can be substantially reduced or eliminated employing as a criterion that the frequency of the spectral wavelet corresponding to a "wrong" (undesirable) foci is significantly different from the target frequency range. Thus, "wrong" (undesirable) foci can easily be detected and can be consistently excluded from the further signal processing.

However, this information (i.e. the information from the "wrong") foci, can be useful as a course indication of the current position of an object point, for example in the case of mechanically approaching/translating an object on a measuring machine.

Figure 7:
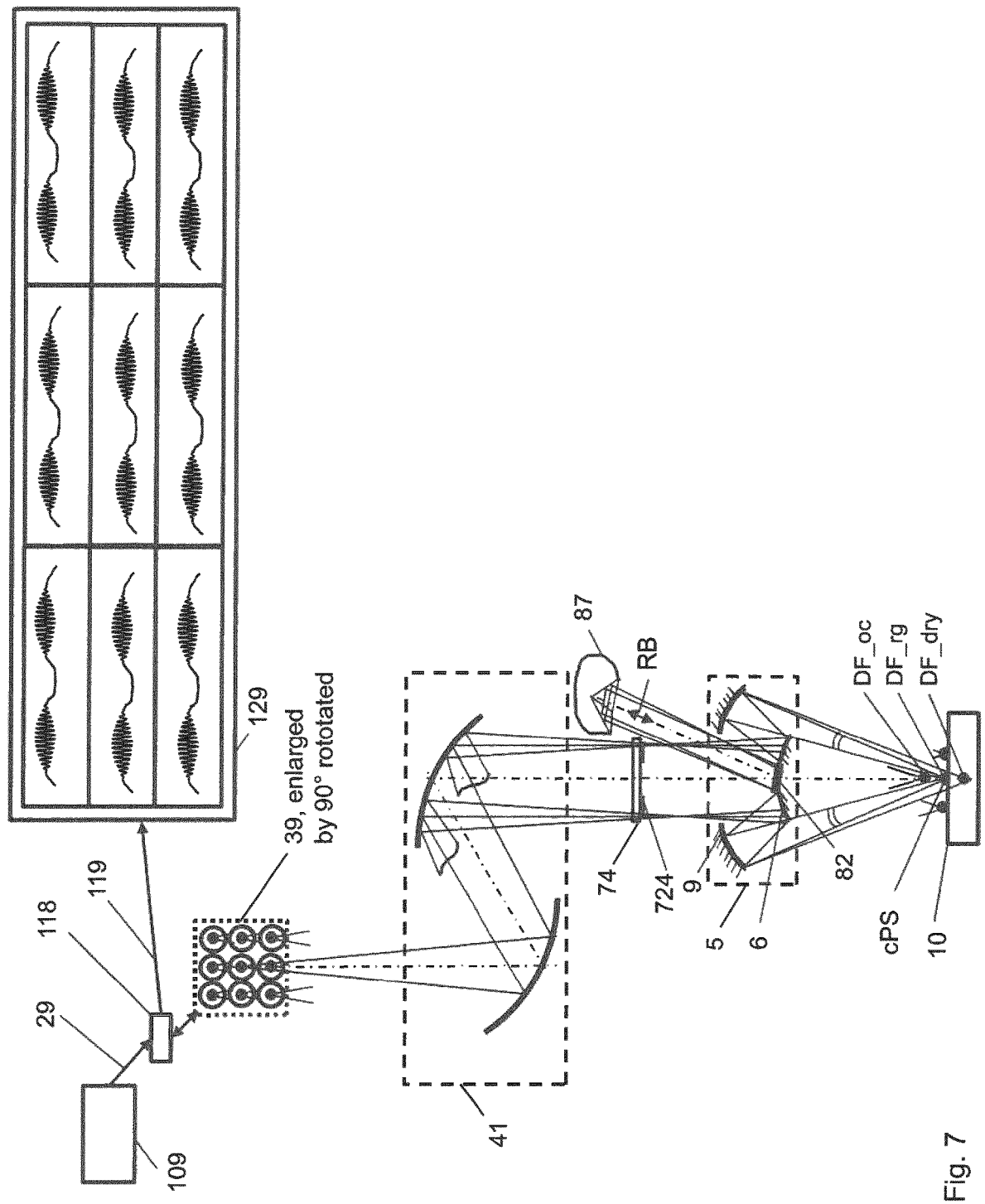
FIG. 7 shows schematically an assembly with 9-fold optical scanning of the measurement object.

FIG. 7 shows schematically an assembly with 9-fold optical scanning of the measurement object 10, i.e. an assembly, in which the measurement is performed in 9 measurement points at the same time. To this end, the light from a multi-spectral light source 109 is coupled into 9 single-mode fibers 29 and via 9 Y-switches 118 reaches 9 fiber ends 39, where it escapes into the open space. The fiber ends are shown schematically in FIG. 3, wherein the size of the fiber ends and the distance between them are enlarged for better visibility. A downstream two-mirror objective in z arrangement 41 without center shading serves as a collimator lens with imaging of the field of the point light sources. The collimated light reaches the convex primary mirror 6 via the bifocal diffractive optical element 724. For better understanding, the weakly diffracted bundles are not emphasized in FIG. 7. Via the plane coupling mirror 82, part of the wavefront is directed into the reference beam path where the reference bundle RB propagates and is reflected at the triple mirror reflector 87 and finally arrives at the 9 fiber ends 39, where it is confocally discriminated. A certain enlargement of the Airy disc with respect to the core diameter of the single-mode fiber is accepted and means a certain reduction in the reference light. From the convex primary mirror 6 of the Schwarzschild objective 5, the diffracted wavefronts (first diffraction order) reach the concave secondary mirror 9 and are focused at different depths of the object space, depending on the color of the light. This results in chromatically depth-split double-foci DF_oc, DF_rg, DF_dry. The light returning from the object partially passes through the bifocal diffractive-optical element 724, again in the first diffraction order and also partially in the respectively associated sub-aperture. Thus, also object light arrives again on the fiber end from which it has emerged in a focused manner. Light that does not satisfy these last criteria (diffraction in the first diffraction order and passing through the sub-aperture appropriate according to the design) is excluded from signal formation by confocal discrimination at the fiber ends 39. By superposition with the reference light, interference occurs after the confocal discrimination of the light. Via nine Y-switches 118, the interfering light reaches a nine-channel spectrometer 129 with 9 inputs. Each channel of the nine-channel spectrometer 129 can simultaneously detect a spectral wavelet, as shown in FIG. 7.

Technically, it is advantageous to adapt or match the numerical aperture of the two-mirror objective 41 to the numerical aperture of the fibers. Typically, the diameters of the cores of the single-mode fibers are in the middle single-digit micrometer range. In such case, the numerical aperture of the two-mirror objective 41 is slightly smaller than that of the Schwarzschild objective 5 (if the Schwarzschild objective has a numerical aperture of about 0.5), to laterally resolve with a comparatively high resolution.

Figure 8A:
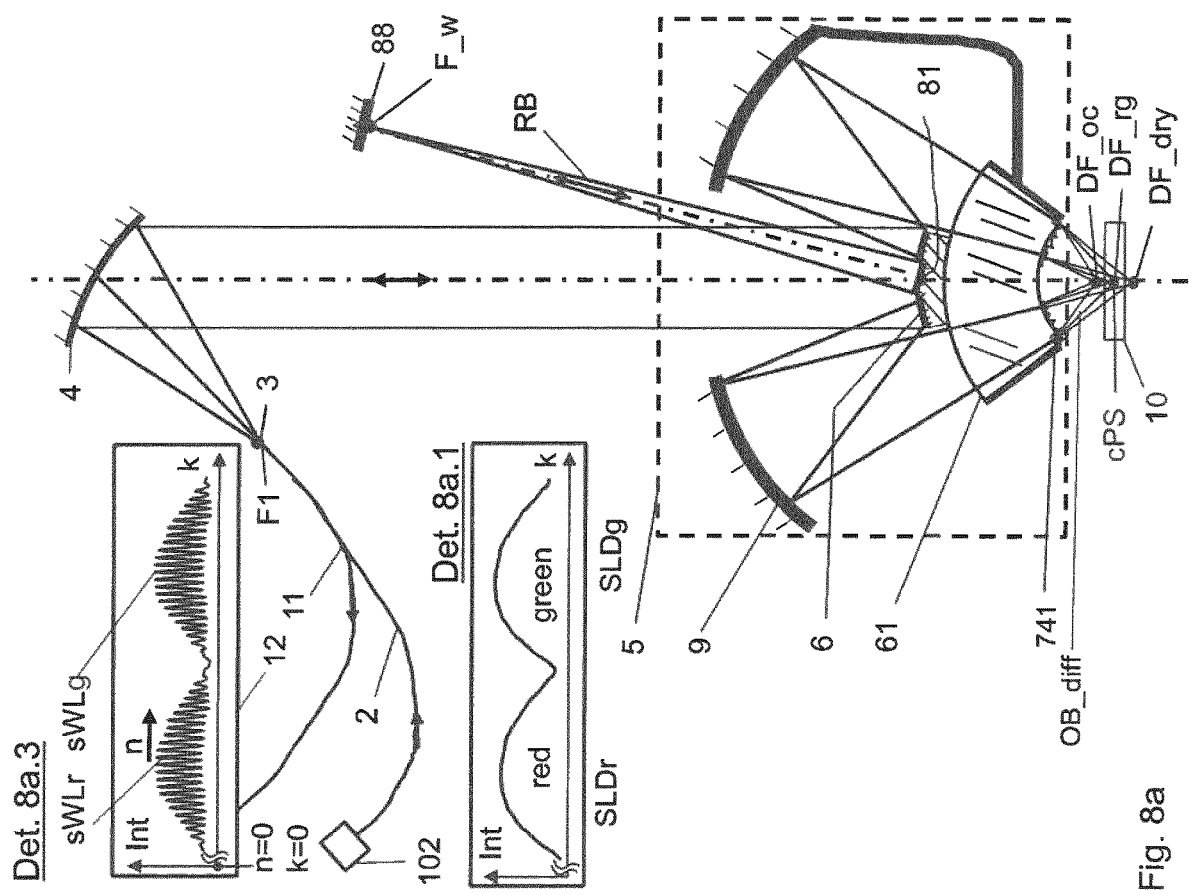
FIG. 8a shows schematically an exemplary assembly including a Fizeau interferometer and a Schwarzschild objective.
Figure 8B:
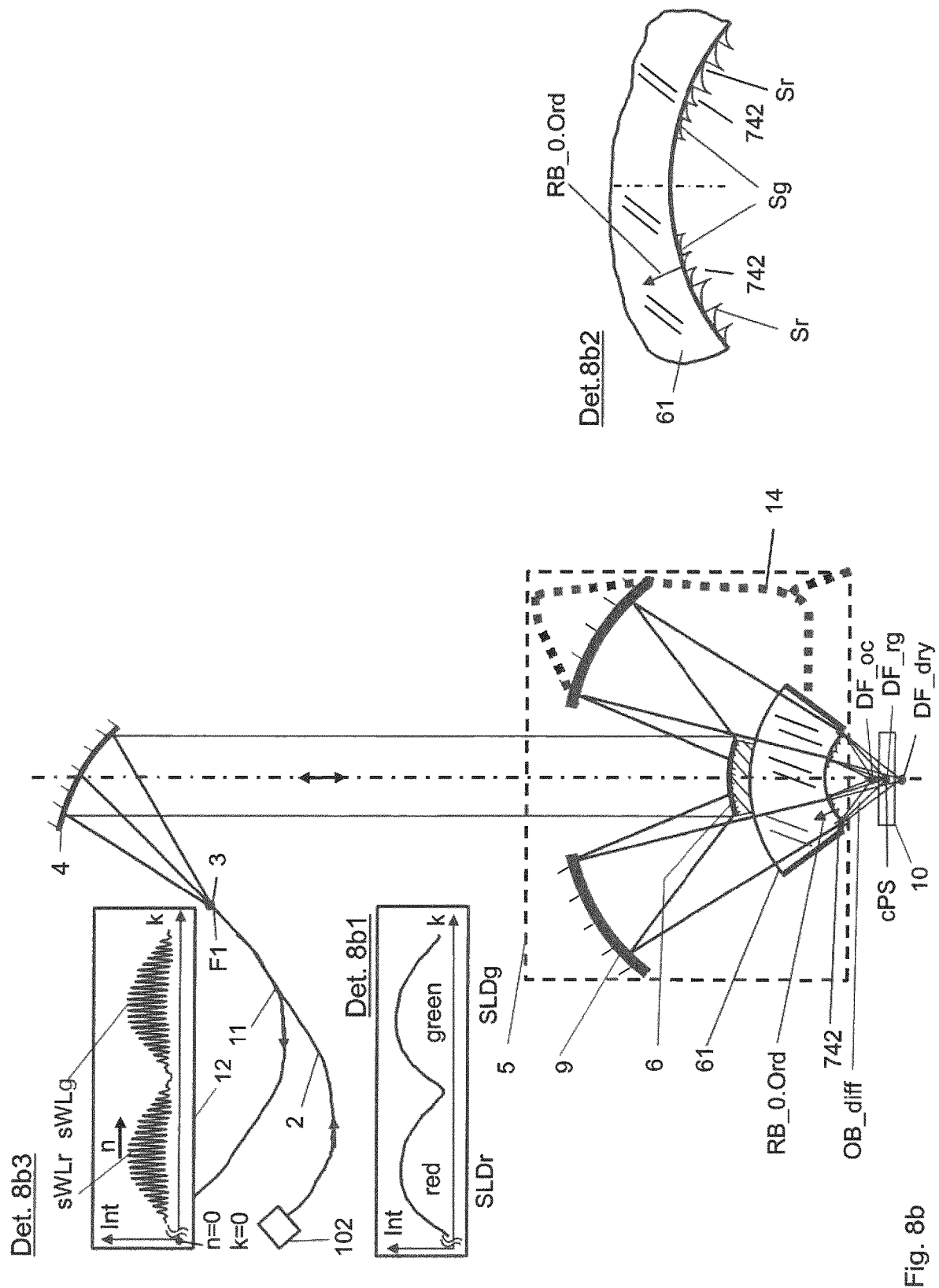
FIG. 8b shows schematically another exemplary assembly including a Fizeau interferometer and a Schwarzschild objective.

FIGS. 8a and 8b show exemplary Fizeau interferometer assemblies, each comprising a Schwarzschild objective 5 and a transparent reference piece 61 having a curved shape in form of a meniscus. The primary mirror 6 of the Schwarzschild objective 5 of the assembly shown in FIG. 8a has a concave off-axis coupling mirror 81 arranged in the central region of the primary mirror 6. The concave off-axis coupling mirror 81 causes splitting of the input wavefront EWF and serves for decoupling and forming a focused reference beam bundle RB and for recoupling the reflected light for detection. The primary mirror 6 of the Schwarzschild objective 5 of the assembly shown in FIG. 8*b* does not comprise a mirror or mirror portion. As explained below, the reference bundle is formed by the 0-th diffraction order reflected by the bifocal diffractive optical element 742.

The meniscus shaped reference piece 61 (hereinafter also referred to as meniscus) is arranged below the primary mirror 6 of the Schwarzschild objective 6 (when viewed in the direction of propagation of the incoming light front). The meniscus shaped reference piece 61 may be connected to the Schwarzschild objective 5 and more specifically to the primary mirror 6 by a suitable connecting arrangement. The assembly shown in FIG. 8*a* is a single-shot Fizeau point sensor, which is suitable for performing measurements on somewhat larger measurement objects. A reference bundle RB is decoupled and reflected by a miniaturized plane mirror 88, which represents an external reference end mirror. An antireflection coating (for example for particular wavelength ranges or wavelengths) on the meniscus 61 is advantageous in order to avoid parasitic interferences.

In both FIGS. 8*a* and 8*b*, an off-axis rotary paraboloid mirror 4 without center shading is used for collimation.

One advantage of the assembly according to FIG. 8*a* is that no "spider thread attachment (spider) is necessary for the primary mirror and the Fizeau surface. The spider attachment of components in the prior art is comparatively susceptible to vibrations from the environment of the interferometer. By using a meniscus, i.e. a meniscus shaped reference piece, the assembly is unusually robust compared to the prior art, since the meniscus can be connected to the frame of a Schwarzschild objective with holders having a large material cross-section. With this arrangement, stable centering of the meniscus is possible by a high-stability frame, thereby ensuring long-term stability of the interferometer.

The meniscus 61 carries a rotationally symmetric bifocal diffractive optical element 741 (FIG. 8*a*) or 742 (FIG. 8*b*) on the object side. Each of the bifocal diffractive optical elements 741 and 742 has a negative refractive power and has two sub-apertures Sr and Sg separated from each other for the depth splitting of foci. The sub-apertures Sr and Sg have exactly the same refractive power for the design wavenumbers $k\_des\_r$ and $k\_des\_g$. In the examples shown in FIGS. 8*a* and 8*b*, the inner sub-aperture Sr is designed for red light and the outer one for green light.

In the example shown in FIG. 8*b*, the bifocal diffractive optical element 742 reflects a bundle of the zero diffraction order RB_0.Ord. The reference bundle is formed as the reflected bundle RB_0.Ord in the zero diffraction order at the element 742. The object bundle OB_diff is formed by diffraction in the first order, in each case on a sub-aperture, so that there is a red and a green object bundle. In the case of strong miniaturization, this assembly is of great advantage, since wavelets with a rather low frequency are generated, and a spectrometer line with clearly less than 10.000 pixels can be used for detection thereof, and the use of an FC light source is therefore superfluous as well. Detail 8.*b*2 shows an enlarged view of the element 742 with two sub-apertures on the meniscus 61, one for red and one for green light.

Details 8*a*.3 and 8*b*.3 show the detected wavelets in the wavenumber k domain, respectively. Details 8*a*.1 and 8*b*.1 show the wavenumber spectrum of the light source 102, respectively.

Figure 9:
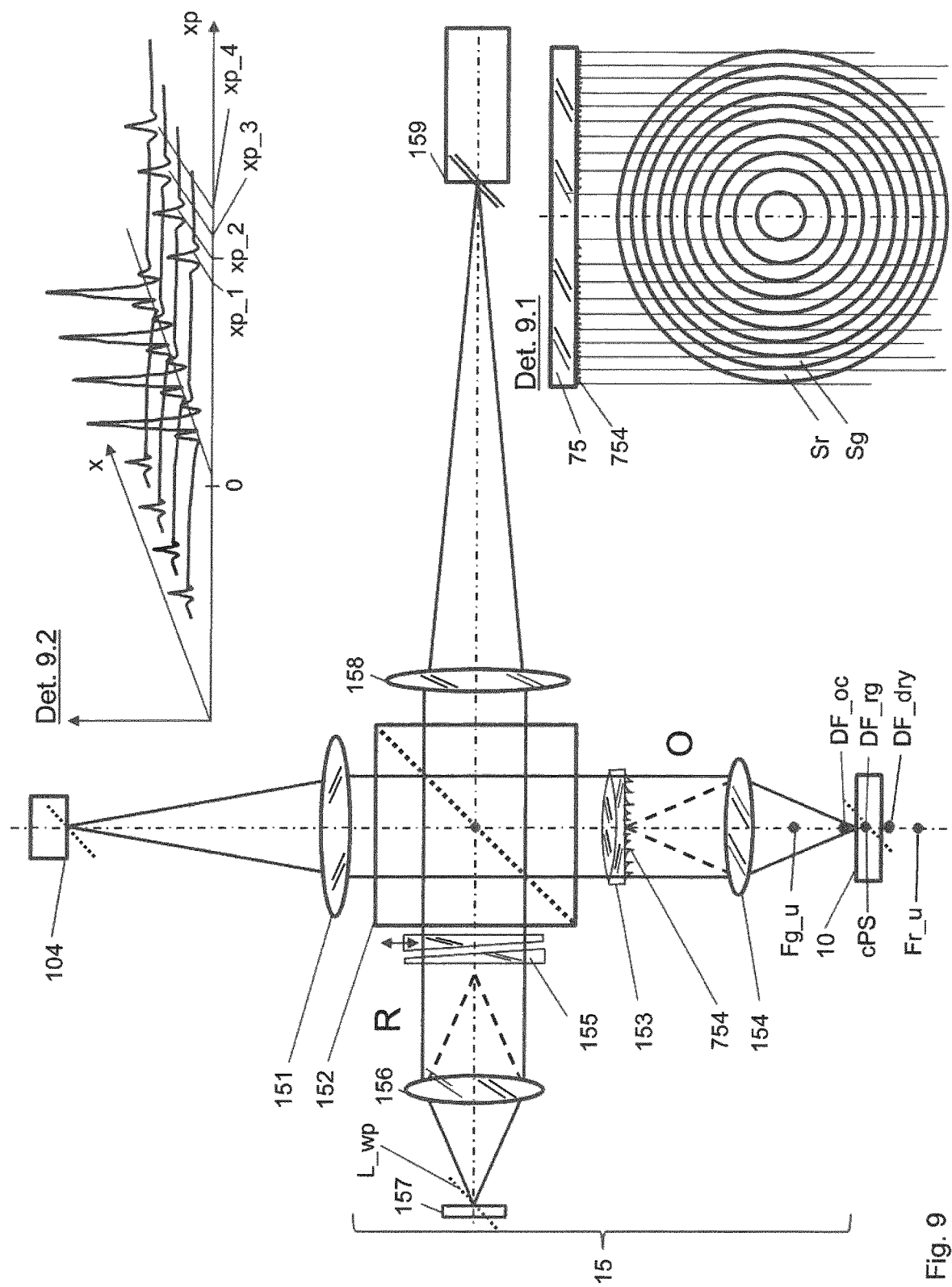
FIG. 9 shows schematically an exemplary single-shot line sensor assembly with a Linnik interferometer.

FIG. 9 illustrates a single-shot line sensor assembly with a Linnik interferometer with refractive objectives 155 and 156 and a line white light source 104. Preferably, the components of this assembly have a good chromatic correction. This applies particularly to the objectives 155 and 156 (reference objective 156 and object objective 155), which preferably have very good sphero-chromatic correction.

In the line white light source 104, light points are arranged along a line, so that there is a small gap or distance between the individual light spots. The sensor assembly includes achromats 153 for refractive power compensation of the bifocal diffractive optical element 754. There exists an infinity optical path in the object objective 155, just as in the reference objective 156.

The compensation of the different optical path lengths in the splitter cube 152 and of the achromat 153 is effected by a wedge plate assembly 155.

Detail 9.1 shows a bifocal diffractive optical element 754 with a total of 9 sub-apertures, 5 sub-apertures for red light and 4 for green light. The diffractive optical element 754 operates in transmission and has a negative refractive power. It is located on the plane side of the achromat 153.

The sub-apertures of the bifocal diffractive optical element 754 are each optimized for one of the two design wavenumbers $k\_des\_red$ and $k\_des\_green$. Two sub-apertures Sr and Sg are shown here as examples (see detail 9.1). By diffraction at the sub-apertures, a chain of double focus foci DF_oc, DF_rg and DF dry is formed, as described above. The double focus D_rg formed by the focus of the light with the green design wavenumber diffracted at the sub-aperture Sg and the focus of the light with the red design wavenumber diffracted at the sub-aperture Sr. The focus Fr_u is a red single-focus formed by light diffracted at the sub-aperture of the bifocal diffractive optical element 754, which is optimized for green light, i.e. at the "unsuitable" sub-aperture. Similarly, the focus Fg_u is a green single-focus from an unsuitable sub-aperture of the bifocal diffractive optical element 754, since it is optimized for red light.

The evaluation is carried out by a single-shot line interferometer 159, with which the position of the optical path difference (OPD) xp is determined in a manner known to a person skilled in the art. Detail 9.2 shows the white light interferograms arising from each light spot by a single-shot interferometer.

In a modification, the measuring assembly shown in FIG. 9 can also be used for an object field measurements in conjunction with a tunable light source. For this purpose, a matrix camera may be used as a detector. To this end, a pinhole matrix for confocal detection is arranged in an intermediate imaging stage in the detection optical path upstream of the matrix camera. The object field is detected two-dimensionally, but with many measurement points.

Figure 10:
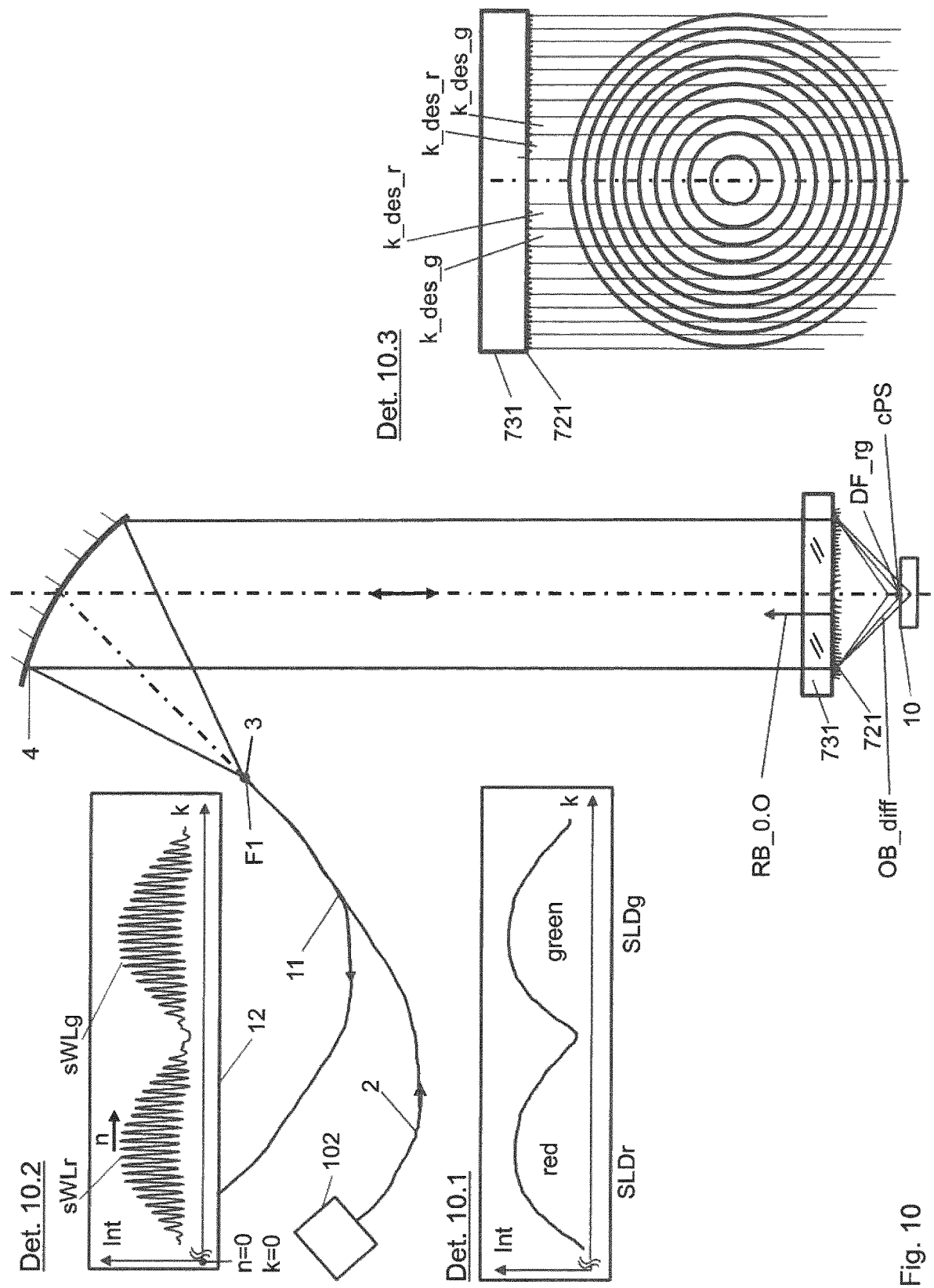
FIG. 10 shows an exemplary Fizeau assembly for a single-shot application.

FIG. 10 shows an exemplary Fizeau assembly for a single-shot application. The assembly is compensated for with respect to the dispersion, since both object light and reference light pass through the same glass paths in the substrate 731 having the bifocal diffractive optical element 721 formed thereon. In the assembly shown in FIG. 10 partitioning of the amplitude is carried out. The total refractive power for focusing is provided by a bifocal diffractive optical element 721 with annular sub-apertures, which diffracts the light in reflection and has a negative refractive power.

Detail 10.3 shows an enlarged view of the bifocal diffractive optical element 721. The bifocal diffractive optical element 721 has a plurality of ring-form, concentric annular sub-apertures. The sub-apertures are designed for the respective design wavenumbers $k\_des\_r$ and $k\_des\_g$, which in this particular example are the red and green spectral ranges. The annular sub-apertures for the design wavenumbers k_des_r and k_des_g alternate, as shown in detail 10.3. In reflection, the reference bundle is formed in the zero diffraction order from the total area of the diffractive optical element. The reflected diffracted light in diffraction orders other than zero is eliminated by confocal discrimination.

Detail 10.1 shows the wavenumber spectrum of the double light source 102. Detail 10.2 shows the detected spectral wavelets in the wavenumber domain (k-domain).

FIG. 11A shows schematically a dispersion-free imaging system/assembly 51 with a trifocal diffractive optical element 743 and a trifocal focus TF, which coincide with the confocal point of the system/assembly. FIG. 11B shows schematically the trifocal diffractive optical element 743 that may be used in conjunction with the dispersion-free imaging system/assembly 51 shown in FIG. 11A. The trifocal diffractive optical element 743 operates in transmission. The trifocal diffractive optical element 743 includes three concentric, ring-form annular sub-apertures, each designed for different design wavenumber (in this particular case red design wavenumber, blue design wavenumber and green design wavenumber). The corresponding to the design wavenumbers diffracted at the respective sub-apertures is focused in the same point (confocal point cPS) to thereby form the trifocal (triple) focus TF. Symbolically, also two false foci are shown above and below the trifocal focus TF.

FIG. 12A shows another exemplary trifocal diffractive optical element 753 for red (r), green (g), and blue (b) light, i.e. for red, green and blue design wavenumbers. The trifocal diffractive optical element 753 includes a plurality of alternating sub-apertures r, g and b, calculated for the red, green and blue design wavenumbers, respectively. Each sub-aperture corresponds to a sector in a radial direction of the trifocal diffractive optical element 753. A central circular part of the trifocal diffractive optical element 753 is substantially free from diffractive structures. Preferably, the trifocal diffractive optical element 753 includes more than 10 sub-apertures.

FIG. 12B shows yet another exemplary trifocal diffractive optical element 763 for red (r), green (g), and blue (b) light, i.e. for red, green and blue design wavenumbers. Similar to the trifocal diffractive optical element 753 shown in FIG. 12A, the trifocal diffractive optical element 763 comprises a plurality of sub-apertures, each sub-aperture corresponds to a sector in a radial direction of the trifocal diffractive optical element 753. However, the form of the sub-apertures is not regular, but a complex, stochastic form.

The trifocal diffractive optical elements 753 and 763 shown in FIGS. 12A and 12B, respectively may be arranged or designed to be rotatable.

FIG. 13A shows an exemplary diffractive optical element 772 calculated and/or optimized for the wavelength 550 nm (i.e. a wavenumer k2). FIG. 13B shows an exemplary diffractive optical element 771 calculated and/or optimized for the wavelength 650 nm (i.e. a wavenumber k1). FIG. 13C shows an exemplary complex diffractive optical element 77 calculated and/or design for both wavelengths, i.e. 550 nm and 650 nm (i.e. for both wavenumbers k1 and k2).

Figure 14A:
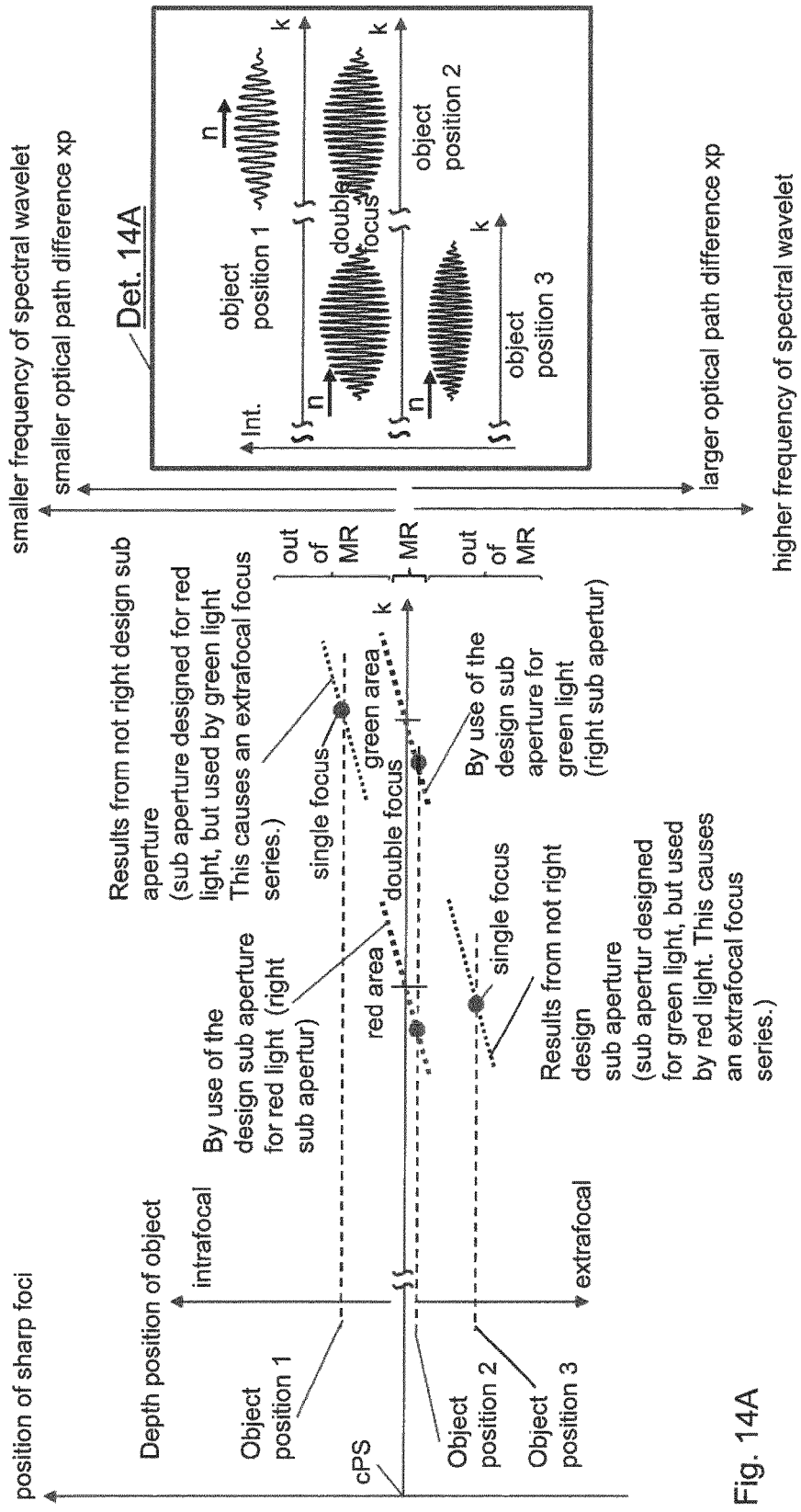
FIG. 14A shows schematically the position of the sharp foci for different wavenumbers and for three different depth positions of the measurement point.

FIG. 14A illustrates the signal generation for an assembly with a bifocal diffractive-optical element, such as the bifocal diffractive-optical element 712, 721, 742, 722, 723 in general. The diffractive optical element 712, 721, 742, 722, 723 has a negative refractive power. The diffractive optical element comprises two sub-apertures, one calculated and/or optimized for red light and one for green light, specifically for the design wavenumbers k_des_red and k_des_green. The position of the optical path difference=zero is in the intrafocal region of the assembly. In FIG. 14A shows only the diffraction in the first order. Depending on the object depth position (more specifically the depth position of the measurement point of the object to be measured), different wavelets are formed, which are shown in Detail 14A.

FIG. 14A shows the position of the sharp foci for different wavenumbers and for three different depth positions of the measurement point of the object. In position 1 (object position 1), the measurement point of the object is intrafocal and do not fall in the measurement range MR. The detected wavelet is shown in detail 14A (see object position 1). In the second position (object position 2), the measurement point of the object is in the measurement range MR, but not in the middle of the measurement range MR. As shown in detail 14A, two wavelets with the same frequency are formed. In the third position (object position 3), the object is arranged extrafocally and only one wavelet is formed, but now with a significantly higher frequency. The wavelets differ significantly due to the different optical path difference. Generally, only the range with two wavelets, i.e. the object in position 2, is regarded as the desired measurement range.

Figure 14B:
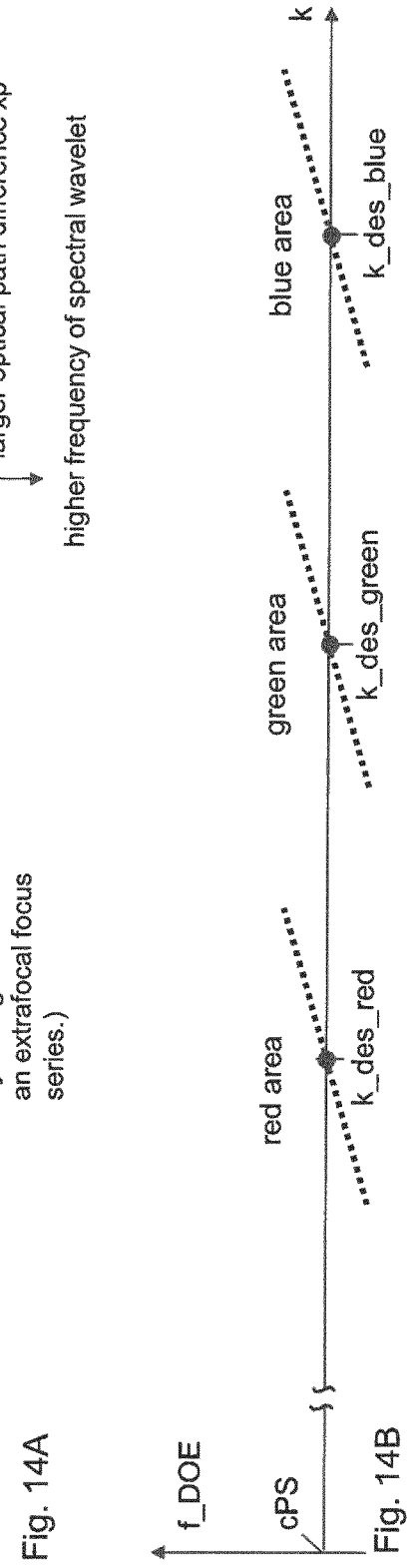
FIG. 14B shows exemplarily the dependency of the focal length f_DOE on the wavenumber k.

FIG. 14B shows exemplarily the dependency of the focal length f_DOE on the wavenumber k according to the presented method for the case of trifocal optical element and design wavenumbers in the red, green and blue spectral ranges (k_des_red, k_des_green and k_des_blue). Three passages through the position of the confocal point cPS of the system are shown. In order for three wavelets to be formed, there must be at least three passages through the confocal point cPS of the system. This can preferably be realized by a diffractive optical element either with three sub-apertures or by a complex trifocal diffractive optical element (as shown for example in FIGS. 12 and 12B). The forming of three focuses that coincide in the confocal point cPS may be realized by the use of the trifocal diffractive optical element alone or preferably in conjunction with a focusing objective. The objective is preferably a mirror objective so that there is no dispersion in the optical beam path and thus no chirping in the signal, i.e. the frequency of the wavelet in the wavenumber domain is constant. Of course, it is possible to employ refractive multifocal (e.g. trifocal) optical elements.

Figure 15A:
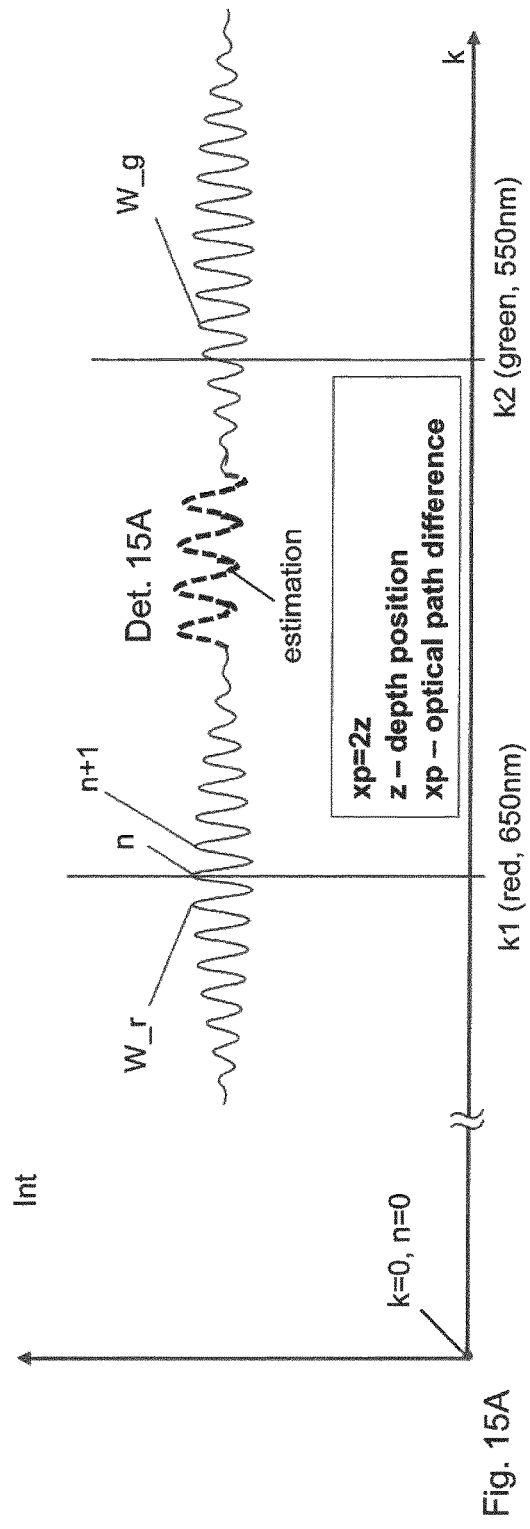
FIG. 15A shows two detected wavelets for a given depth position.

FIG. 15A shows two detected wavelets for a given depth position. To perform correct estimation, the phase is preferably strictly linear, which is possible by employing mirror optical systems. Both wavelets are measured simultaneously using a single-shot spectrometer, as described above. The two detected wavelets are a wavelet in the red W_r spectral range corresponding to a red design wavenumber and a wavelet in the green W_g spectral range corresponding to a green design wavenumber. The shown wavelets are not shown up to scale for better understanding. For example, the detected wavelets usually have a significantly higher frequency than shown in FIG. 15A. "Green" and "red" are only used as an example, other design wavenumbers and spectral ranges may be used. The usable spectral range may range from the EUV, VUV through FIR to the terahertz spectral range. For each of these ranges, specialized optical hardware may be employed. FIG. 15A shows an extension of the two wavelets in the wavenumber domain determined by estimation, or by using further information, for example from an FFT. The location of the centers of gravity of the wavelets may be used as well. Various other possibilities are generally known to the skilled person. From the detected wavelets, it is possible to obtain data related to the optical path difference xp and the depth position z, wherein xp=2z.

Figure 15B:
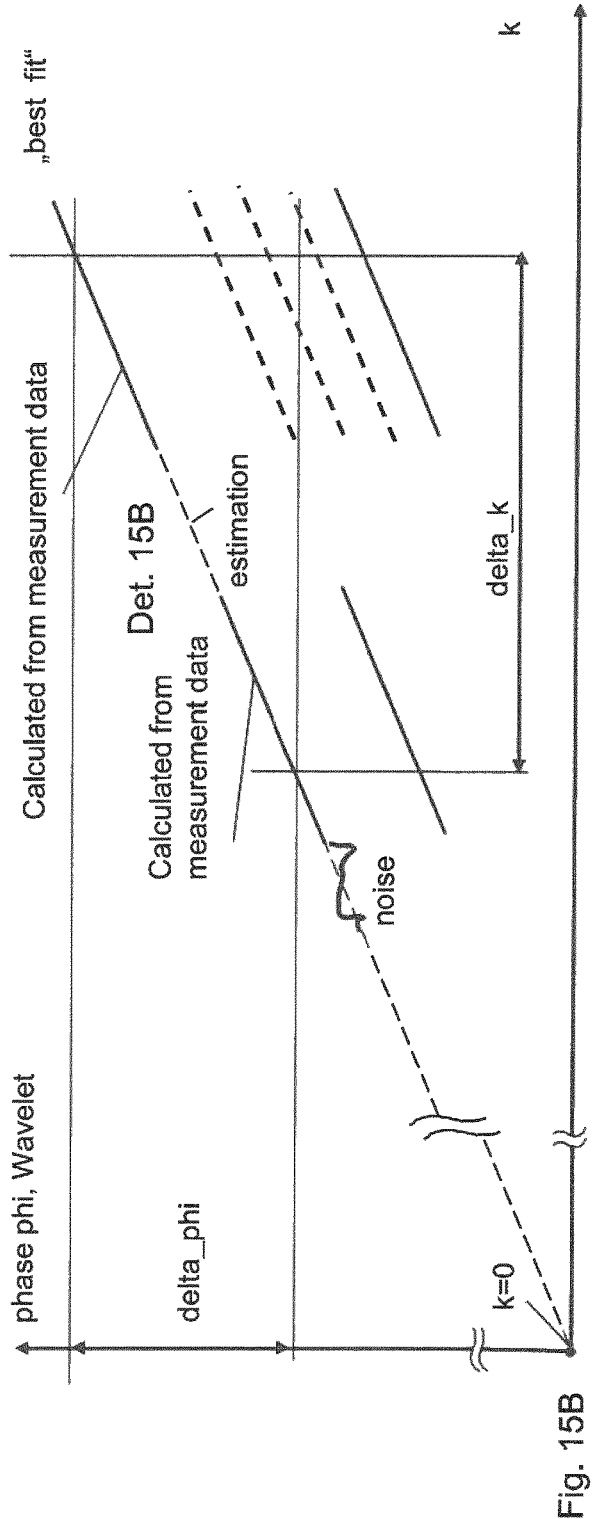
FIG. 15B shows the phase as a function of the wavenumber k.

FIG. 15B shows the dependency of the phase phi on the wavenumber (i.e. the phase progression). The phase may be calculated from the detected data (measurement data) in the sense of a best-fit. Detail 15B illustrates the estimation of the phase phi based on measurement data.

The optical path difference xp can be determined according to the theory of spectral interferometry according to equation (1).

$$xp = \tan(\text{alpha}) = \text{delta\_phi}/\text{delta\_k} \qquad \text{Equation (1)}$$

The optical path difference xp is related to the object point depth/height z according to equation (2):

$$xp = 2z \qquad \text{Equation (2)}$$

In the above equation, z denotes the depth position and xp the optical path difference.

Figure 16A:
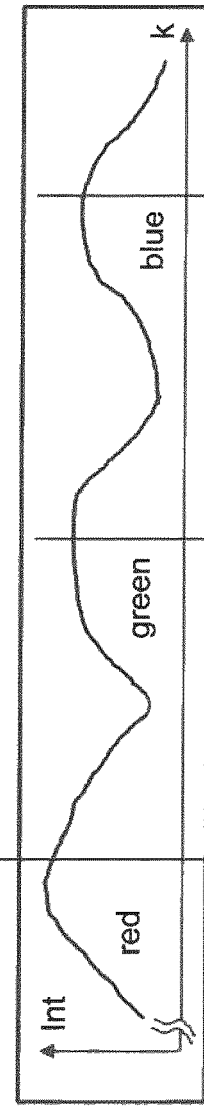
FIG. 16A shows the spectrum of a multispectral light source.
Figure 16B:
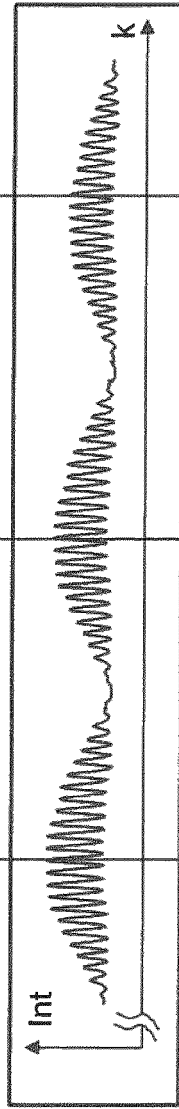
FIG. 16C shows the relative phase phi of each of the wavelets.
FIG. 16D shows the estimation of the tan(alpha) based on the phase data.
Figure 16C:
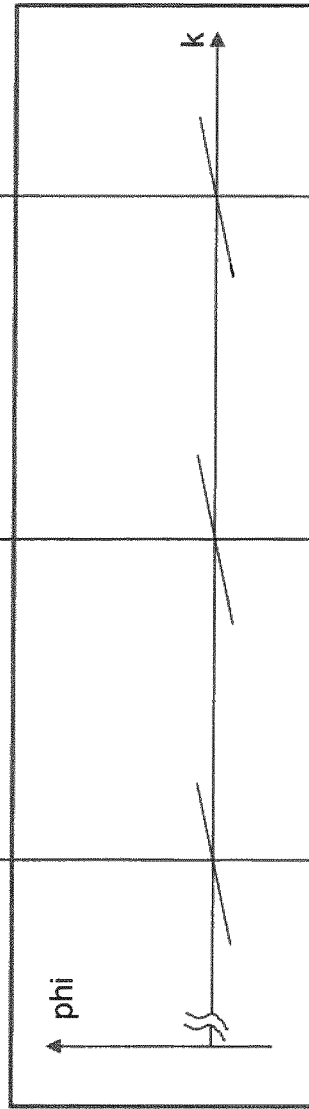
Figure 16D:
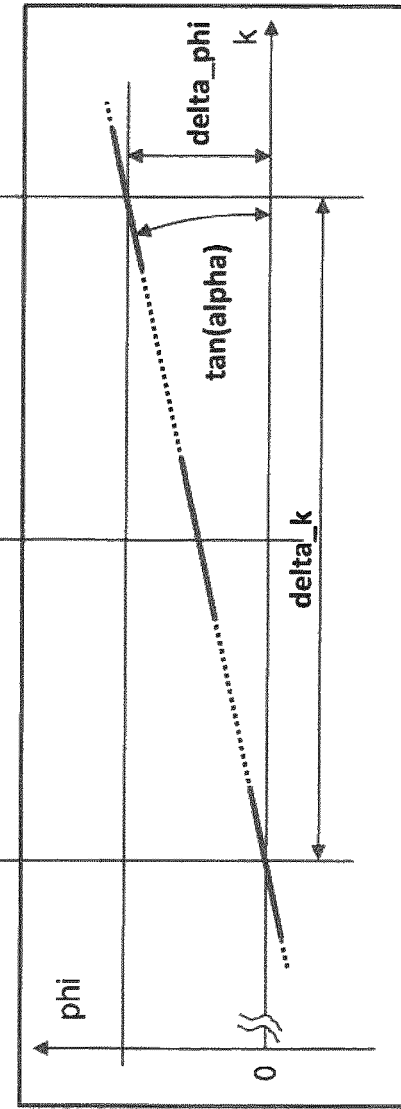

FIGS. 16A to 16D illustrate the case for three design wavenumbers. Since the assembly is a non-dispersive assembly, the three wavelets are in phase and there is no chirping. FIG. 16D shows the target. FIG. 16A shows the spectrum of a multispectral light source (intensity Int as a function of the wavenumber k), FIG. 16B shows the detected wavelets in case of triple focus, FIG. 16C shows the relative phase phi of each of the wavelets and FIG. 16D shows the estimation of the tan(alpha) based on the phase data. Based on estimated tan(alpha), the depth of the measurement point of the object to be measured may be determined, using for example equations (1) and (2).

Figure 17:
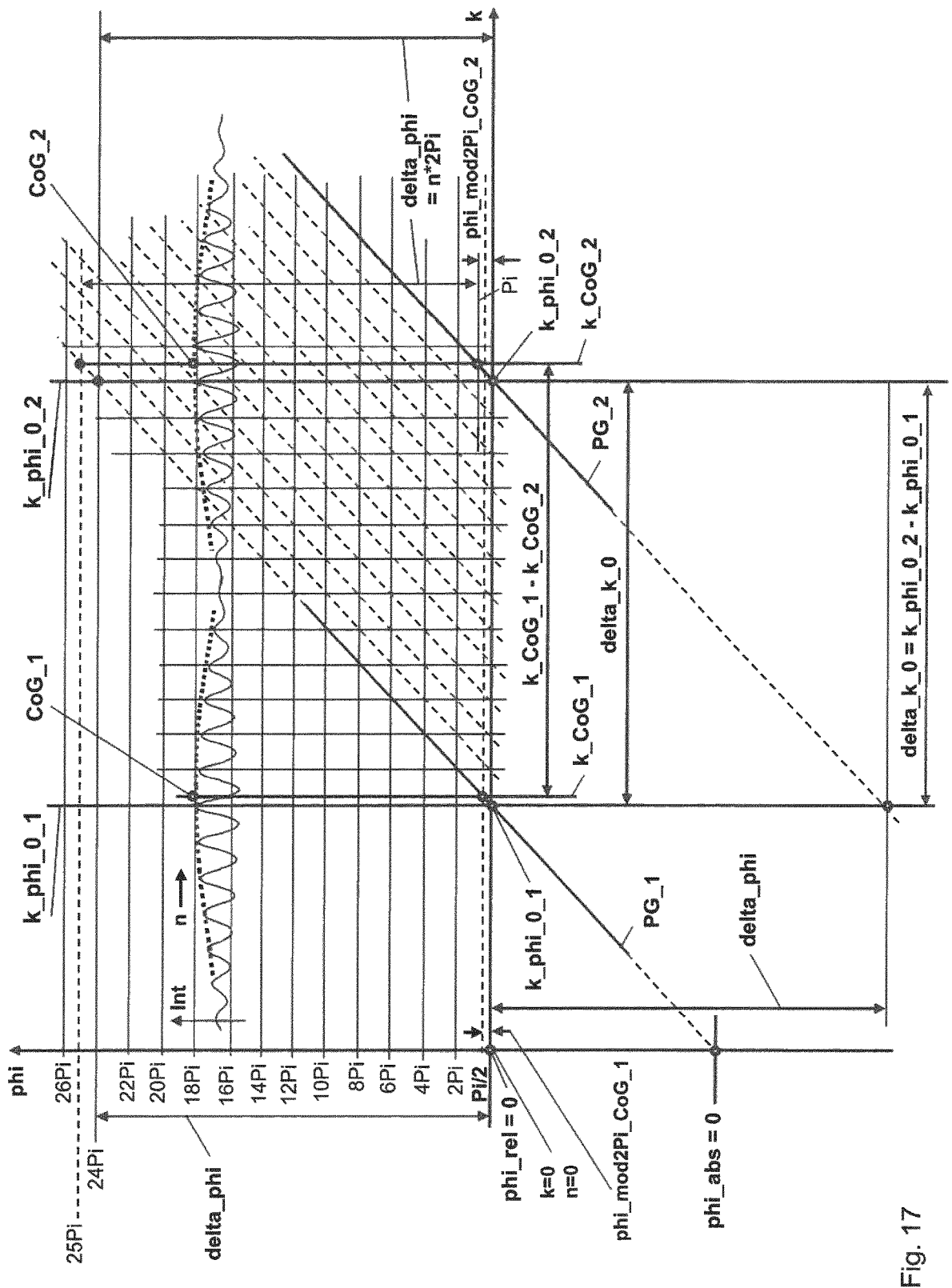
FIG. 17 shows the phase phi in the wavenumber domain.

FIG. 17 shows the phase phi the wavenumber domain. The objective is to determine the phase shift delta_phi. The phase shift delta_phi is usually larger than 2Pi.

The phase mod 2Pi can be determined from all intensity values of each of the detected wavelets. Preferably, only intensity values that are higher than a modulation threshold indicating reasonable modulation are used for the calculations. The scanning of each spectral wavelet by the spectrometer 12 takes place linearly in the wavenumber domain while observing the sampling theorem. The spectrometer 12 with its scanning comb is designed such that from intensity value to intensity value, the phase difference is half a Pi, i.e. approximately 90 degrees+/−30 degrees. A robust phase evaluation algorithm with odd-numbered intensity values may be employed to evaluate the phase. For example, a 7-frame algorithm may be applied and unwrapping for the modulo 2Pi calculated phase values may be performed. A suitable 7-phase evaluation algorithm, which is still substantially error-free even in the event of deviations from the 90° value of the phase, has been described by Peter de Groot in Applied Optics, Vol. 34, 22, 1995, FIG. 3, p. 4728. The phase estimation algorithm yield a phase progression around the center of gravity CoG of each wavelet up to the modulation threshold. This phase progression represents at least approximately a linear function of the phase phi over the wavenumber k, i.e. the phase straight line PG. The wavenumber values at the two centers of gravity $k\_phi\_CoG\_1$ and $k\_phi\_CoG\_2$ of the two wavelets are determined. The associated phase values in FIG. 17 are $phi\_mod2Pi\_CoG\_1 = Pi/2$ and $phi\_mod2Pi\_CoG\_2 = Pi$. The associated wavenumber value $k\_phi\_0\_1$ for the phase 0 and the associated wavenumber value $k\_phi\_0\_2$ for the phase 0 are determined. In this case, the values of $k\_phi\_0\_2 - k\_phi\_0\_1$ must be less than Pi, i.e. less than 180°.

From the difference $delta\_k\_0$ of the determined wavenumbers $k\_phi\_0\_2 - k\_phi\_0\_1$ $$delta\_k\_0 = k\_phi\_0\_2 - k\_phi\_0\_1, \qquad \text{Equation (3)}$$

it is possible to determine the optical path difference xp according to equation (4)

$$xp = (n*2Pi)/delta\_k\_0 \qquad \text{Equation (4)}$$

For this purpose, however, the difference n of the orders must be determined first. In FIG. 17, the order difference n is exemplarily assumed to be n=12 (other order differences are, of course, also possible). This corresponds to a phase shift delta_phi equal to n*2Pi with n=12, i.e. to a phase shift delta_phi equal to 24 Pi. Under real conditions, the phase shift delta_phi may be considerably greater than 24 Pi.

The approximated order differencen_apr is related to the approximated optical path difference xp_apr according to the equation (5):

$$n\_apr = xp\_apr * delta\_k\_0/2Pi. \qquad \text{Equation (5)}$$

The approximated optical path difference xp_apr can be determined by a Fourier transformation of the optical signal with the two wavelets in the wavenumber domain (k-domain). The uncertainty of measurement or the (higher) accuracy achievable by a Fourier transformation is sufficient for a plurality of measurement tasks. The variable n_apr determined based on equation (5) is rounded to an integer value n. In principle, an important task is to obtain optical primary data of such (high) quality that the integer n can be reliably determined.

In order to reduce the uncertainty of measurement or increase the accuracy, the calculated integer n can be inserted into equation (4) to calculate the optical path difference xp, from which the depth position z of an object point can be obtained with equation (2).

This result is then compared to the values resulting from the evaluation of the envelopes and the determination of CoG_1 and CoG_1 for this case. It is checked whether the two values coincide at at least approximately. The skilled person is aware of several known possibilities to correctly determine and adjust the order integer n.

In FIG. 17, delta_phi is equal to n*2Pi and the phase shift is (exemplarily) equal to 24 Pi with n=12. As shown in FIG. 17, the variable delta_phi is always an even multiple of 2Pi, if the optical system is free from dispersion or completely dispersion-compensated.

Further, the present invention relates to one or more of the following aspects:

Aspect 1: An assembly for chromatic confocal spectral interferometry, in particular also in single-shot operation, for detecting distance, depth, profile, shape, ripple and/or roughness or the optical path length in or on technical or biological objects, also in layer form, or also for spectral domain coherence tomography (SD-OCT), in each case in at least one point. The assembly comprises the following means/components:

a source of electromagnetic radiation 1, 102, 103, 104, 109 for illuminating the object 10 with light of at least two wavenumbers defined as design wavenumbers k_des_r, k_des_g, k_des_b, k_des_1, k_des_2, k_des_3, k_des_4, k_des_n, an interferometer, with a chromatic object optical path O and with a achromatic reference optical path R, in which an end reflector 88 is arranged, and at least one measurement point MP in the object optical path, in which a surface or volume element of the object 10 to be measured is at least approximately located, and an optical imaging system for illuminating and imaging at least one single object point of the object 10, and either a spectrometer 12 with a rasterized detector for electromagnetic radiation in the form of at least one spectral wavelet (sWL), or a tunable light source and a detector for electromagnetic radiation in the form of at least one spectral wavelet sWL, wherein a bifocal diffractive optical element (DOE) 712, 721, 722, 723, 724, 741, 742, 754 in the object optical path is assigned to the imaging system, and the bifocal DOE 712, 721, 722, 723, 724, 741, 742, 754 is designed/configured with respect to its refractive power such that the foci of the imaging system coincide in at least one confocal point of the optical system (of the setup) cPS in the object domain for light of the design wavenumbers k_des_r, k_des_g, k_des_b, k_des_1, k_des_2, k_des_3, k_des_4, k_des_n and double foci are respectively formed with light of two different wavenumbers, or a trifocal diffractive optical element 743 in the object optical path is assigned to the imaging system, and the trifocal diffractive optical element 743, 753, 763 is designed/configured with respect to its refractive power such that the foci of the imaging system coincide in at least one confocal point of the system (of the setup) cPS in the object domain for light of the design wavenumbers k_des_1, k_des_2, k_des_3, and triple foci are respectively formed with light of three different wavenumbers, or a quattro-focal (quad-focal) DOE in the object optical path is assigned to the imaging system, and the quadfocal diffractive optical element is designed/configured with respect to its refractive power such that the foci of the imaging system coincide in at least one confocal point of the system (of the setup) cPS in the object domain for light of the design wavenumbers k_des_1, k_des_2, k_des_3, k_des_4, and quadruple foci are respectively formed with light of four different wavenumbers, or a multi-focal DOE with n>4 in the object beam path is assigned to the imaging system, and the multi-focal diffractive optical element is designed with respect to its refractive power such that the foci of the imaging system coincide in at least one confocal point of the system (of the setup) cPS in the object domain for n discrete design wavenumbers k_des_1, k_des_2, k_des_3, k_des_n . . . , and confocal multi-foci, consisting of exactly n single foci each with light of exactly n different discrete design wavenumbers, are formed.

Aspect 2: The assembly for chromatic confocal spectral interferometry or also for spectral domain coherence tomography (SD-OCT) according to aspect 1, wherein a mirror objective is arranged in the spectral interferometer for illuminating and imaging at least one single object point of the object 11.

Aspect 3: The assembly for chromatic confocal spectral interferometry or also for spectral domain coherence tomography (SD-OCT) according to aspects 1 and 2, wherein the mirror objective is designed as a Schwarzschild objective 5 with a primary mirror 6 with a center region 81, which is usually unused for object illumination, and a secondary mirror 9 for illuminating and imaging at least one single object point of the object 10. Here, the confocal point of the system (of the setup) cPS preferably is at least approximately on the optical axis of the Schwarzschild objective.

Aspect 4: The assembly for chromatic confocal spectral interferometry or also for spectral domain coherence tomography (SD-OCT) according to aspect 3, wherein a plane or concave mirror surface 8, 81, 82 is formed in the usually unused center region 1 of the primary mirror 8, downstream of which the end reflector 87, 88 is arranged.

Aspect 5: The assembly for chromatic confocal spectral interferometry or also for spectral domain coherence tomography (SD-OCT) according to aspect 3, wherein a through-opening is introduced into the usually unused center region of the primary mirror 6, to which a plane or concave mirror below the primary mirror 6 is assigned—below in the standard representation of a Schwarzschild objective—downstream of which the reference end reflector 87, 88 in the reference optical path is arranged.

Aspect 6: The assembly for chromatic confocal spectral interferometry or also for spectral domain coherence tomography (SD-OCT) according to any one of aspects 1 to 5, wherein the bifocal DOE 711, 721, 722, 723, 724, the trifocal DOE 743, 753, 763, the quattrofocal DOE or the multifocal diffractive optical element with n>4 is formed with sub-apertures Sr, Sg for the individual design wavenumbers k_des_1, k_des_2, k_des_3, k_des_n. These sub-apertures may be separated from each other and do not overlap.

Aspect 7: The assembly for chromatic confocal spectral interferometry or also for spectral domain coherence tomography (SD-OCT) according to any one of aspects 1 to 5, wherein the bifocal, trifocal, quattrofocal or multifocal diffractive optical element is formed as a complex phase hologram for the individual design wavenumbers k_des1, k_des2, k_des_n.

Aspect 8: A method for chromatic confocal spectral interferometry, in particular also in single-shot operation, for detecting distance, depth, profile, shape, ripple and/or roughness or the optical path length in or on technical or biological objects, also in layer form, or also for spectral domain coherence tomography (SD-OCT), in each case at least one point, comprising the features of the generic term of the assembly. The method may employ a spectral interferometer and at least one multi-spectral light source with at least discrete two design wavenumbers, a continuum spectrum and with a spectrometer.

The method is characterized in that:

for a number of two, three, four or even more discrete design wavenumbers k_des_1, k_des_2, k_des_3, k_des_n . . . , double, triple, quadruple or multiple foci are formed in the object domain by optical bifocal, trifocal, quattrofocal or even multifocal (with n>4) optical means or components in the object arm of the spectral interferometer, which foci are confocal, i.e. which coincide in at least one confocal point of the system (of the setup) cPS always in at least an approximate manner;

and these discrete design wavenumbers k_des_1, k_des_2, k_des_3, k_des_n . . . are part of a common continuum spectrum, or each design wavenumber k_des_1, k_des_2, k_des_3, k_des_n . . . belongs to a continuum spectrum, and light of the wavenumbers from the continuum spectrum, which is different to the design wavenumbers, forms chromatically depth-split foci, which do not fall into a confocal point of the system cPS, and at least two wavelets are detected by a spectrometer.

Further, the above described features related to the assembly apply.

In particular, as explained above, for a number of two, three, four or even more discrete design wavenumbers, double, triple, quadruple or multiple foci (with n>4) are formed in the object domain by optical bifocal, trifocal, quattrofocal or even multifocal (with n>4) optical means or components in the object arm of the spectral interferometer, which foci are confocal, i.e. which coincide in at least one confocal point of the system (of the setup) cPS always in at least an approximate manner.

The focus position, depending on the wavenumber, i.e. the focal length variation as a function of the wavenumber, represents an alternating function with at least two passages through the confocal point of the system (of the setup) cPS. This function preferably has a sawtooth characteristic. Thus, preferably a characteristic with long linear ascending branches results. This function can be realized by bifocal, trifocal, quattrofocal or multifocal (with n>4) diffractive optical elements with sub-apertures for the individual design wavenumbers. In contrast to diffractive optical systems, refractive bifocal, trifocal or multifocal optical systems can only approximate this function. Furthermore, refractive objectives usually also produce non-linearities in the form of chirping in the wavelets due to dispersion in the optical system. This often results in significant signal evaluation problems and also requires higher computing power.

The discrete design wavenumbers may be a part of a common continuum spectrum, or each individual discrete design wavenumber may belong to its own continuum spectrum. The light of the wavenumbers from the continuum spectrum, which is different from the design wavenumbers, forms chromatically depth-split foci, which, however, do not fall into the confocal point of the system cPS, since this point cPS is only hit by light of the design wavenumbers. At least two wavelets are detected by a spectrometer.

Furthermore, in the method for chromatic confocal spectral interferometry, the following condition preferably apply regarding the value of the optical path difference xp in the interferometer:

$$2/k^*\_min < |xp| < 10.000 k^*\_min.$$

Here, k* is defined with k*=1/lambda. A spectral evaluation is possible for this range.

Preferably, in the interferometer, the light or radiation source is designed as a tunable light or radiation source. Preferably, the radiation source is also designed as a tunable infrared quantum cascade laser or as a tunable terahertz radiation source so as to be able to carry out spectral interferometry without a spectrometer. To this end, it is advantageous for the radiation source to be designed spatially coherent. With such an arrangement, swept-source spectral domain OCT, also known as swept-source Fourier domain OCT, can be carried out in the infrared and terahertz range. Particularly when using fast swept-source sources, preferably an x-y scanner can be arranged downstream of a Schwarzschild objective in order to obtain an image, so that an area or volume detection of the object is possible.

Aspect 9: The method for chromatic confocal spectral interferometry according to aspect 8, wherein the wavelets preferably each include exactly one of the discrete design wavenumbers k_des_1, k_des_2, k_des_3, k_des_n . . . .

Aspect 10: The method for chromatic confocal spectral interferometry according to aspect 8 or 9, wherein chromatically depth-split foci are formed by light-diffracting means.

Aspect 11: The method for chromatic confocal spectral interferometry according to any one of aspects 8 to 10, wherein confocal discrimination of the light coming from the object 10 is carried out by optical means or components prior to the spectral analysis by a spectrometer 12.

By the multi-range spectral interferometry described herein, in the confocal point of the system (of the setup) cPS in a defined wavenumber range in the visible spectral range, at least two—two in the bifocal case—foci of different color are simultaneously formed in the object optical path of the spectral interferometer or the SD-OCT system by diffractive-optical elements. Preferably two or three differently colored foci are formed in the confocal point of the system (of the setup) cPS, which correspond to a depth position in the object domain.

Furthermore, the information from the envelope evaluation of the spectral signals, such as their position in the spectrum, can preferably be used at least as an "estimator" for the determination of the absolute phase shift delta_phi over the detected spectral wavelets and thus also for checking the freedom from contradictions of the calculated data.

For SD-OCT, the FFT is performed over the entire propagation range of the spectral signal above a modulation threshold in the wavenumber domain, which may consist of several separate or also overlapping wavelets. The modulation threshold is selected such that the signal noise essentially does not come to signal processing.

Preferably, two or more wavelets are generated in phase in different wavenumber ranges. This greatly facilitates the evaluation, since complex corrective calculations can be largely omitted.

The axial measurement range corresponds to at least twice the wave-optical depth of field DOF at the largest wavenumber k*, which results from the numerical aperture of the objective for the object image.

The multifocal light source may also be designed as a frequency comb source. The frequency comb light source may also be tunable. This allows a full-area scanning of the object without having to use mechanically moved components in the assembly.

The multifocal light source may also be designed with a Fabry-Perot interferometer. The Fabry-Perot resonator may also be tunable. This allows a full-area scanning of the object without having to use mechanically moved components in the assembly.

Preferably, the optical assembly of the spectral interferometer can also be constructed with entirely refractive objectives, which have a focal position that changes over the wavenumber. There are at least two design wavenumbers. Here, the cPS is hit at least twice by light of one design wavenumber. For the resulting spectral wavelets, a minimum of non-linearities in the wavenumber domain is desirable, i.e. chirping has to be minimized. Only in this way can a numerical correction of the chirping effect be achieved with an acceptable numerical effort.

The computational aspects of the proposed method and assembly described above can be implemented in digital electronic circuitry, or in computer hardware, firmware, software, or in combinations of them. When appropriate, aspects of these systems and techniques can be implemented in a computer program product, for example tangibly embodied in a machine-readable storage device for execution by a programmable processor; and method steps can be performed by a programmable processor executing a program of instructions to perform functions by operating on input data and generating an output. To provide for interaction with a user, a computer system can be used having a display device, such as a monitor or a LCD screen for displaying information to the user and a keyboard, a pointing device such as a mouse or a trackball, a touch-sensitive screen, or any other device by which the user may provide input to computer system. The computer system can be programmed to provide a graphical user interface through which the computer program(s) interact(s) with the user.

A number of embodiments and example have been described above. Nevertheless, it will be understood that various modifications may be made. For example, various components may be combined in a different manner and still achieve desirable results. Accordingly, other embodiments are within the scope of the claims.

| | List of the reference numerals with explanations |
|---|---|
| Reference numeral | Designation |
| 1 | fiber-coupled broadband light source |
| 102 | fiber-coupled double light source formed with two broadband SLDs, one in the red (SLDr) and one in the green (SLDr) |
| 103 | Fiber-coupled triple light source formed with three broadband SLDs, one in the red (SLDr) one in the green (SLDr) and one in the blue spectral range |
| 104 | Line light source formed with two broadband SLDs, one in the red (SLDr) and one in the green (SLDr) spectral region. Preferably, light points are arranged along a line so that it is not a true (continuous) line light source, but rather a multi-point light source in line arrangement. |
| 109 | Multi-spectral light source coupled to 9 single-mode fibers |
| 2 | Single-mode fiber |
| 29 | Nine single-mode fibers |
| 3 | End of the single-mode fiber. This end may serve, on the one hand, as an output of the light into the optical set-up and, on the other hand, as a confocal discriminator in the reentrance of the returning light. |
| 39 | Nine fiber ends arranged in a block, turned by 90° in the drawing plane for better visibility and understanding. |
| 4 | Off-axis rotation paraboloid mirror, which works as a collimator lens |
| 41 | A mirror objective without center shading as a collimator lens with imaging of a field of point light sources. The mirror objective may be a two-mirror objective in z-arrangement. Its numerical aperture is preferably smaller than that of the Schwarzschild objective 5. |
| 5 | Schwarzschild objective imaging at least one object point |
| 51 | Dispersion-free imaging system with a diffractive optical element 743 |
| 6 | Convex primary mirror |
| 61 | Meniscus (meniscus shaped reference piece) |
| 712 | Bifocal annular diffractive optical element having two sub-apertures, which operates in reflection and has a negative refractive power. The diffractive optical element is applied to a convex primary mirror 6, the center of which is free for the decoupling mirror for the reference optical path. There are the two sub-aperture regions Sr and Sg, in which the diffractive optical structures are optimized for the respective wavenumbers $k\_des\_r$ and $k\_des\_g$. |
| 72 | Substrate for a bifocal diffractive optical element 722, 723. The substrate 72 also carries the miniaturized plane mirror 89. |
| 721 | Bifocal diffractive optical element with annular sub-apertures, which diffracts the light in reflection and has a negative refractive power. The reflected diffracted light is eliminated by confocal discrimination. The annular sub-apertures alternate. The sub-apertures are designed for the respective wavenumbers $k\_des\_r$ and $k\_des\_g$. In reflection, the reference beam is formed in the zero diffraction order of the total area of the diffractive optical element. |
| 722 | Bifocal diffractive optical element with two sub-apertures in transmission on a substrate 72, which has a negative refractive power and the center of which is free for the reference beam bundle RB. The substrate 23 carries a miniaturized plane mirror 89. |
| 723 | Bifocal diffractive optical element with a total of 9 sub-apertures, 5 sub-apertures for red light and 4 for green light. It operates in transmission and has a negative refractive power. It is located on a substrate 72, the center of which has a free ring for the reference beam bundle RB. A miniaturized plan mirror 89 is located in the center of 723. |
| 724 | Bifocal diffractive optical element with a total of 9 sub-apertures, 5 sub-apertures for red light and 4 for green light. It operates in transmission and has a negative refractive power. It is located on a substrate 74, the center of which has a free ring for the reference beam bundle RB. |
| 724_des_1 | 5 sub-apertures for red light |
| 724_des_2 | 4 sub-apertures for green light |
| 731 | Substrate for a bifocal diffractive optical element 721 (FIG. 10) |
| 74 | Substrate for bi-focal diffractive optical element 724 |
| 741 | Rotationally symmetric bifocal diffractive optical element having a negative refractive power, in transmission with two sub-apertures on meniscus 61 for depth splitting with respect to object 10 |
| 742 | Rotationally symmetric bifocal diffractive optical element having a negative refractive power, in transmission with two sub-apertures on meniscus 61 for depth splitting with respect to the object 10 and on which a bundle of the zero diffraction order is reflected |
| 743 | Rotationally symmetric trifocal diffractive optical element in transmission with a total of three sub-apertures (r, g, b) for depth splitting with respect to the object 10. It is used in conjunction with a non-dispersive imaging system 51. |
| 753 | Rotationally symmetric trifocal annular diffractive optical element with a negative refractive power and many sub-apertures, preferably with more than 10 sub-apertures |

| Reference numeral | Designation |
|---|---|
| 754 | Bifocal diffractive optical element with a total of 9 sub-apertures, 5 sub-apertures for red light and 4 for green light. It operates in transmission and has a negative refractive power. It is located on an achromat 153. |
| 763 | Stochastic trifocal diffractive optical element with a negative refractive power and many sub-apertures, more than 10 sub-apertures |
| 771 | A complex phase hologram for focusing, calculated for a focus number k1, which represents a diffractive optical element |
| 772 | A complex phase hologram for focusing, calculated for a focus number k2, which represents a diffractive optical element |
| 77 | A complex phase hologram for focusing, calculated for two focus numbers k1 and k2, which represents a diffractive optical element |
| 8 | Concave on-axis coupling mirror for coupling and decoupling reference light and forming a focused reference beam bundle RB. It causes splitting of the input wavefront EWF and is arranged coaxially with respect to the optical axis of the Schwarzschild objective 5. |
| 81 | Concave off-axis coupling mirror for decoupling and for forming a focused reference beam bundle RB and also for recoupling the reflected light for detection. The concave off-axis coupling mirror causes splitting of the input wavefront EWF. |
| 82 | Plane coupling mirror for coupling and decoupling of the reference beam bundle RB and also for recoupling the reflected light. This coupling mirror effects splitting of the input wavefront EWF. |
| 87 | Triple mirror reflector (hollow cube reflector) serves as a reference end mirror |
| 88 | Miniaturized planar mirror serves as a reference end mirror (external) |
| 89 | Miniaturized plane mirror, arranged coaxially with respect to the optical axis of the Schwarzschild objective 5 and serving as a reference end mirror |
| 9 | Concave secondary mirror |
| 10 | Measurement object |
| 11 | Y-switch |
| 111 | Single-mode fiber to spectrometer |
| 118 | Nine Y-switches |
| 119 | Nine single-mode fibers to spectrometer |
| 12 | Fiber-coupled spectrometer |
| 121 | Line spectrometer with area camera |
| 129 | Nine-channel spectrometer (9 inputs) |
| 13 | Spectral interferometer, here with a negative DOE |
| 14 | Holders for meniscus 61 and other components for a compact, mechanically stable construction |
| 15 | Linnik-interferometer |
| 151 | Collimator |
| 152 | Splitter cube |
| 153 | Achromat for refractive power compensation of the bifocal diffractive optical element 723 with a total of 9 sub-apertures for the object objective 154 |
| 154 | Object lens designed for infinity |
| 155 | Wedge plate arrangement for compensating the optical path difference (OPD) |
| 156 | Reference objective |
| 157 | Reference mirror |
| 158 | Tube lens |
| 159 | Single-shot line interferometer (ROSI 1) according to DE |
| cpf | chromatically separated foci, three chains of foci in different colors |
| cPS | Confocal point of the optical system in the object space |
| delta_k_0 | Difference of the wavenumbers as a result of the penetration points of the phase line through the abscissa in the representation phi over k according to FIG. 17 delta_k_0 = k_phi_0_g − k_phi_0_r |
| delta_k_CoG_r − CoG_g | Difference of the wavenumbers as a result of the position of the two centers of gravity (CoG_r and CoG_g) in the representation phi over k (see FIG. 17) |
| delta_phi | Phase shift is a multiple of 2Pi. Thus, delta_phi = n*2Pi, wherein $\pi$ is an integer |
| DF_oc | Orange-cyan double focus |
| DF_rg | Red-green double focus |
| DF_dry | Dark red-yellow double focus |
| DOF | Wave-optical depth of field |
| f_achr | Achromatic focal length, for example 160 mm - like an optical standard |
| f_DOE | Focal length of a diffractive optical element (DOE) as a function of the wavenumber k |

-continued

| Reference numeral | Designation |
|---|---|
| f_des | Focal length in design wavenumber |
| F_des | Focal point that results from the design wavenumber |
| f_cPS | Focal length defined by the confocal point of the system (the array) in the object space. f_cPS = f_des |
| FFT | Fast Fourier transformation |
| Fg_r | Green single focus from unsuitable sub-aperture (i.e. not designed for the wavenumber), which is optimized for red |
| Fr_u | Red single foci from unsuitable sub-aperture, since it is optimized for green |
| FT_x | Fourier transform of the wavelets in the wave domain, which represents an optical path difference, here the optical path difference xp_grob. |
| F_w | White focus, always in the reference of the interferometer this is an achromatic focus point (F_achr) |
| Int | Intensity |
| k | Wavenumber, with $k = 2Pi/lambda$ (attention: $k^*$, $k^* = 1/lambda$ exists as well) |
| $k^*$ | Wavenumber, defined with $k^* = 1/lambda$ (attention: k, $k = 2Pi/lambda$ exists as well) |
| k_CoG_g | Calculated wavenumber for the center of gravity position of the "green" wavelet. This is not necessarily equal to the design wavenumber. As a rule: k_CoG_g unequal k_des_g (k_CoG_g ≠ k_des_g) |
| k_phi_0_g | Calculated wavenumber for the zero phase directly below the phase value k_CoG_g |
| k_CoG_r | Calculated wavenumber for the center of gravity position of the "red" wavelet. This is not necessarily equal to the design wavenumber. As a rule: k_CoG_r unequal k_des_r (k_CoG_r ≠ k_des_r) |
| k_phi_0_r | Calculated wavenumber for the zero phase directly below the phase value k_CoG_r |
| k_CoG_g | Calculated wavenumber for the center of gravity position CoG_g of the "green" wavelet |
| k_des_r (=k_des_1) k_des_g (=k_des_2) k_des_b, k_des_3, ... k_des_n | Design wavenumbers for the sub-apertures with diffractive optical structures of a bi or trifocal diffractive optical element, the sub-apertures of which let light in connection with the Schwarzschild objective 5 confocal foci coincide with light of different wavenumbers. The sub-apertures in the respective DOE always lead to the same focal length f_des for the associated design wavenumber, so that the foci of the design wavelengths k_des always hit the confocal point cPS of the system (the assembly) in the object space. (Target: F_des = cPS) There are at least two different design wavenumbers, for example design wavenumbers k_des_r (red light) and k_des_g (green light). The foci of the light of the wavenumbers k_des_r and k_des_g, which are diffracted at the sub-apertures of the bifocal element, always coincide due to the special design of the diffractive optical element. In the object space, for example, there are always pairs of foci of different wavenumbers (colors), which represent double foci, here DF. The design wavenumbers k_des_r (red light), k_des_g (green light) and k_des_b (blue light) have corresponding associated design wavelengths lambda_r, lambda_g and lambda_b. Even if a single (i.e. without sub-apertures) complex hologram is formed as a bi, tri, quattro or multifocal diffractive optical element, according to the invention, the foci of the light of the design wavelengths always fall into the confocal point cPS of the system (the assembly) in the object space. |
| lambda | Wavelength |
| lambda_des_g | Design wavelength in the green range, e.g. 555.56 nm |
| lambda_des_r | Design wavelength in the red range, e.g. 625 nm |
| n | Absolute order (order number) of the spectral bands counted from $k = 0$ (leads to the n-th order spectral stripe) for k, $k^* = 0$, n is always 0, by definition. Spectral bands are also referred to as Tolansky bands (Tolansky bands). A channeled spectrum of Tolansky bands. n is also the integer number of wavelengths lambda, which fits in the optical path difference xp for a given wavenumber $k^* = 1/lambda$. |
| delta_n | Integer difference of the number of wavelengths which fits in the optical path difference xp for two defined wavenumbers, for example for the design wavelengths $k^*\_des\_r$ and $k^*\_des\_g$ delta_n = int[xp*($k^*\_des\_g$ - $k^*\_des\_r$)] with $k^*\_des\_g$ > $k^*\_des\_r$ |
| n_apr | Approximated number of wavelengths lambda, which fits in in the optical path difference xp. The number n_apr is usually not an integer. |

List of the reference numerals with explanations

| Reference numeral | Designation |
| --- | --- |
| L_wf | Line of white focus points |
| MR | Measurement range |
| O | Object space |
| OB_diff | Diffracted object bundle |
| phi | Phase in the spectral range |
| phi_mod2Pi_CoG_r | Calculated phase mod 2Pi at CoG_r |
| phi_mod2Pi_CoG_g | Calculated phase mod 2Pi at CoG_g |
| RB | Reference bundle<br>The decoupled reference bundle can be inclined with respect to the optical axis of the Schwarzschild objective 6. The reference bundle is preferably focused and, in this case, impinges on a plane mirror 88.<br>However, the reference bundle decoupled from a plane mirror 82 may also remain collimated and then impinge on a triple reflector 87 (hollow cube reflector). |
| RB_0.Ord | Bundle of the 0-th diffraction order in reflection, produced at the rotationally symmetric bifocal diffractive optical element 742, which represents an achromatic reference beam. |
| Sr, S1 | Sub-aperture area with design for red light of the wavenumber k_des_r |
| Sg, S1 | Sub-aperture area with design for green light of the wavenumber k_des_g |
| SLDr | Superluminescence diode, dominant in the red spectral range, but also with color components from dark red to orange |
| SLDg | Superluminescence diode, dominant in the green spectral range, but also with color components from yellow to cyan |
| sWLg | Spectral wavelet in the green spectral range |
| sWLr | Spectral wavelet in the red spectral range |
| TF | Triple-focus of the light of the three design wavenumbers k_des_red, k_des_green, k_des_blue |
| x | Lateral coordinate (no optical path difference) |
| xp | Optical path difference OPD in the spectral interferometer |
| xp_apr | Approximated optical path difference<br>It can preferably be determined by Fourier transformation via at least two wavelets, which are in phase or whose phase position with respect to each other is numerically corrected by using a priori information. |
| z | Depth position (coordinate) resulting from the optical path difference xp in the spectral interferometer with z = xp/2 for two-beam interferometer assemblies in air or vacuum by definition. |

The invention claimed is:

1. An assembly for chromatic confocal spectral interferometry or for spectral domain coherence tomography, the assembly comprising:
a source of electromagnetic radiation for illuminating at least one measurement point of an object with light comprising n spectral components having n discrete predetermined wavenumbers defined as design wavenumbers, wherein n is an integer equal or greater than two;
an interferometer having a chromatic object optical path including the at least one measurement point and an achromatic reference optical path, in which an end reflector is arranged;
an optical imaging system for illuminating and imaging at least one single object point of the object; and
a detector assembly for detecting electromagnetic radiation in the form of at least one spectral wavelet,
wherein a multifocal optical component is arranged in the chromatic object optical path and assigned to the imaging system, said multifocal optical component being configured to form, in combination with the imaging system, n foci corresponding to the n spectral components with the n-discrete design wavenumbers, wherein the n foci corresponding to the n spectral components with the n-discrete design wavenumbers coincide in at least one confocal point in an object space of the assembly, and
wherein the multifocal optical component is a multifocal diffractive optical component or a system comprising a plurality of diffractive optical elements.

2. The assembly of claim 1, wherein:
the multifocal optical component is a bifocal optical component configured with respect to its refractive power such that the foci of the imaging system coincide in the at least one confocal point for light of the design wavenumbers thereby forming double foci with light of two different wavenumbers; or
the multifocal optical component is a trifocal diffractive optical component configured with respect to its refractive power such that the foci of the imaging system coincide in the at least one confocal point) for light of the design wavenumbers thereby forming triple foci with light of three different wavenumbers; or
the multifocal optical component is a quattro-focal diffractive optical component configured with respect to its refractive power such that the foci of the imaging system coincide in the at least one confocal point for light of the design wavenumbers thereby forming quadruple foci with light of four different wavenumbers.

3. The assembly according to claim 1, further comprising a mirror objective arranged in the interferometer for illuminating and imaging at least one single object point of the object.

4. The assembly according to claim 3, wherein the mirror objective is a Schwarzschild objective with a primary mirror and a secondary mirror for illuminating and imaging the at least one single object point of the object.

5. The assembly according to claim 4, wherein:
a plane or concave mirror surface is formed in a center region of the primary mirror and the end reflector is arranged downstream of the plane or concave mirror surface in the reference optical path; or a through-opening is formed into a center region of the primary mirror and a plane or concave mirror arranged below the primary mirror is assigned to the through-opening, wherein the reference end reflector is arranged downstream of the plane or concave mirror in the reference optical path.

6. The assembly according to claim 1, wherein:

the multifocal diffractive optical component comprises a plurality of sub-apertures, each sub-aperture corresponding to a different one of the design wavenumbers; or the multifocal diffractive optical component is formed as a complex phase hologram configured for the design wavenumbers.

7. The assembly according to claim 1, wherein:

the design wavenumbers are embedded in a common continuum spectrum, or each design wavenumber is embedded in a corresponding continuum spectrum, and the imaging system is configured such that light of the wavenumbers from the continuum spectrum, which is different to the design wavenumbers, forms chromatically depth-split foci, which do not fall into the confocal point.

8. The assembly according to claim 1, wherein:

the interferometer is a spectral interferometer; or the assembly further comprises a spectrometer arranged at the output of the interferometer; or the source of electromagnetic radiation is a tunable electromagnetic radiation source.

9. A method for chromatic confocal spectral interferometry or for spectral domain coherence tomography, the method comprising:

providing an assembly having:

a source of electromagnetic radiation for illuminating at least one measurement point of an object with light comprising n spectral components having n discrete predetermined wavenumbers defined as design wavenumbers, wherein n is an integer equal or greater than two;

an interferometer having a chromatic object optical path including the at least one measurement point and an achromatic reference optical path, in which an end reflector is arranged;

an optical imaging system for illuminating and imaging at least one single object point of the object;

a detector assembly for detecting electromagnetic radiation in the form of at least one spectral wavelet, and a multifocal optical component arranged in the chromatic object optical path and assigned to the optical imaging system, forming n foci corresponding to the n spectral components with the n-discrete design wavenumbers, wherein the n foci corresponding to the n spectral components with the n-discrete design wavenumbers coincide in at least one confocal point in the object space of the assembly; and detecting a plurality of wavelets by the detector assembly, wherein the multifocal optical component is a multifocal diffractive optical component or a system comprising a plurality of diffractive optical elements.

10. The method according to claim 9, wherein the design wavenumbers are embedded in a common continuum spectrum, or each design wavenumber is embedded in a corresponding continuum spectrum, and wherein the method further comprises forming chromatically depth-split foci by the light of the wavenumbers from the continuum spectrum, which is different to the design wavenumbers, and wherein the chromatically depth-split foci do not fall into the confocal point of the system.

11. The method according to claim 9, wherein each wavelet includes exactly one of each of the design wavenumbers or wavenumbers that are different from the design wavenumbers.

12. The method according to claim 9, further comprising:

performing confocal discrimination of the light coming from the object prior to a detection by the detector and performing a spectral analysis by a spectrometer.

13. The method according to claim 9, wherein the following condition applies to the amount of the optical path difference in the interferometer:

$$2/k^*\text{min} < |xp| < 10.000 k^*\_\text{min},$$

wherein k*=1/lambda is the wavenumber.

* * * * *